United States Patent
Mizutani et al.

(12) 
(10) Patent No.: US 6,688,705 B2
(45) Date of Patent: Feb. 10, 2004

(54) PRESSURE CONTROL APPARATUS WHEREIN PRESSURE CONTROL ACTUATOR IS CONTROLLED BASED ON TWO OR MORE PROVISIONALLY DETERMINED CONTROL VALUES

(75) Inventors: Yasuji Mizutani, Susono (JP); Hiroshi Isono, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/898,086

(22) Filed: Jul. 5, 2001

(65) Prior Publication Data

US 2002/0033639 A1 Mar. 21, 2002

(30) Foreign Application Priority Data

Jul. 28, 2000 (JP) ........................................ 2000-229281

(51) Int. Cl.$^7$ ................................................ B60T 8/44
(52) U.S. Cl. ..................................... 303/114.1; 303/155
(58) Field of Search ............................ 303/113.4, 114.1, 303/114.2, 113.3, 115.4, 155, 122.04

(56) References Cited

U.S. PATENT DOCUMENTS

| | | | | |
|---|---|---|---|---|
| 4,678,243 A | * | 7/1987 | Leiber ..................... | 303/113.4 |
| 4,914,917 A | * | 4/1990 | Schonlau ................. | 303/113.4 |
| 4,950,027 A | * | 8/1990 | Reinartz et al. .......... | 303/113.3 |
| 5,029,951 A | * | 7/1991 | Nishii ..................... | 303/114.1 |
| 5,531,509 A | * | 7/1996 | Kellner et al. ........... | 303/114.1 |
| 6,135,577 A | * | 10/2000 | Ishii ....................... | 303/114.1 |
| 6,196,641 B1 | * | 3/2001 | Oka et al. ................ | 303/114.1 |
| 6,412,881 B1 | * | 7/2002 | Isono ...................... | 303/114.1 |

FOREIGN PATENT DOCUMENTS

| | | |
|---|---|---|
| JP | 8-67242 A | 3/1996 |
| JP | 11-502169 A | 2/1999 |
| JP | 11-504296 A | 4/1999 |

OTHER PUBLICATIONS

U.S. patent application Ser. No. 09/287,707, filed, Apr. 7, 1999.
U.S. patent application Ser. No. 09/712,124, Isono et al., filed Nov. 15, 2000.
U.S. patent application Ser. No. 09/725,044, Isono et al., filed Nov. 29, 2000.
U.S. patent application Ser. No. 09/481,365, filed Jan. 11, 2000.
U.S. patent application Ser. No. 09/481,273, filed Jan. 11, 2000.

* cited by examiner

Primary Examiner—Jack Lavinder
Assistant Examiner—Xuan Lan Nguyen
(74) Attorney, Agent, or Firm—Oliff & Berridge, PLC

(57) ABSTRACT

A Hydraulic pressure control apparatus, includes a hydraulic pressure source device operable according to a control amount, to generate an output pressure thereof on the basis of a fluid pressure corresponding to an operating force of a manually operable operating member, and on the basis of a control pressure controlled by a pressure control actuator according to a control amount. The control apparatus further includes an actuator control device including a final-control-value determining portion operable to determine a final value of the control amount, which is used to control the pressure control actuator. A final control value is determined on the basis of at least two provisional control values.

22 Claims, 9 Drawing Sheets

[IN OFF STATE]

[IN ON STATE]

FIG. 5

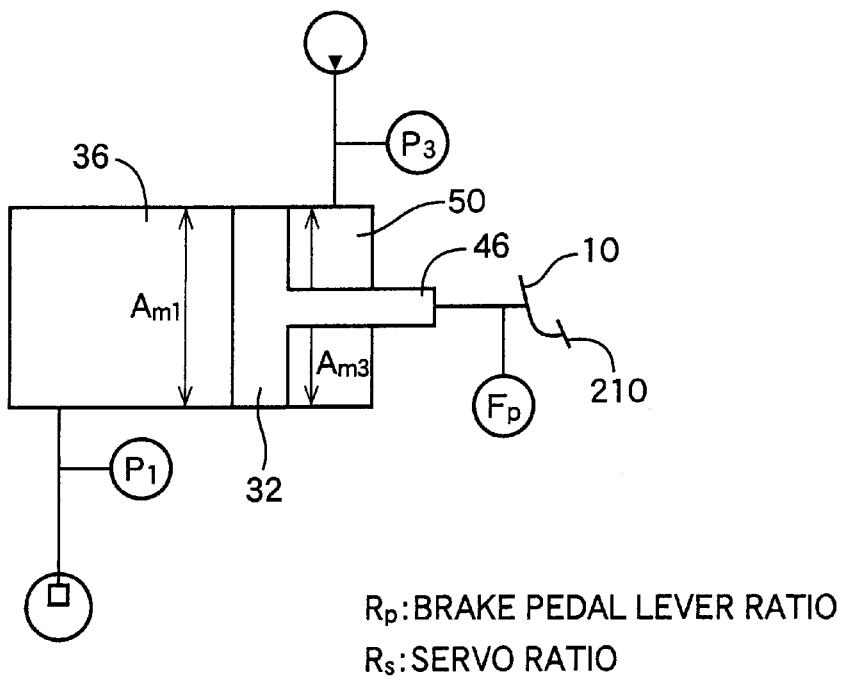

$R_p$: BRAKE PEDAL LEVER RATIO
$R_s$: SERVO RATIO $$A_{m1} \times P_1 = (F_p - F_a) \times R_p + A_{m3} \times P_3 \quad \cdots (1)$$
$$(F_p \geqq F_a)$$

$$R_s = \frac{A_{m1} \times P_1}{(F_p - F_a) \times R_p} \quad \cdots (2)$$

$$A_{m3} \times P_3{}^* = (F_p - F_a) \times R_p \times (R_s - 1) \quad \cdots (3)$$

$$A_{m3} \times P_3{}^* = (A_{m1} \times P_1 - A_{m3} \times P_3) \times (R_s - 1) \quad \cdots (4)$$

$$A_{m3} \times P_3{}^* = A_{m1} \times P_1 \times (1 - \frac{1}{R_s}) \quad \cdots (5)$$

$$P_3{}^* = F(I_s) \quad \cdots (6)$$

PRESSURE CONTROL APPARATUS WHEREIN PRESSURE CONTROL ACTUATOR IS CONTROLLED BASED ON TWO OR MORE PROVISIONALLY DETERMINED CONTROL VALUES

This application is based on Japanese Patent Application No. 2000-229281 filed Jul. 28, 2000, the contents of which are incorporated hereinto by reference.

BACKGROUND OF THE INVENTION

1. Field of the Invention

The present invention relates in general to a hydraulic pressure control apparatus, and more particularly to techniques for determining a control value of a pressure control actuator provided in the pressure control apparatus.

2. Discussion of Related Art

JP-A-8-67242 discloses a hydraulic pressure control apparatus including (a) a hydraulic pressure source device provided with a pressure control actuator operable according to a control value, and (b) an actuator control device which includes a control-value determining portion operable to determine the control value of the pressure control actuator, and which controls the pressure control actuator according to the control value determined by the control-value determining portion. In this hydraulic pressure control apparatus, the control value of the pressure control actuator is determined on the basis of an operating force applied to a manually operable brake operating member. Accordingly, an output hydraulic pressure of the hydraulic pressure control apparatus changes immediately in response to a change in the operating force of the brake operating member. Although the hydraulic pressure control apparatus has a high degree of control response, it tends to suffer from control hunting.

SUMMARY OF THE INVENTION

It is therefore an object of the present invention to provide a hydraulic pressure control apparatus which has a reduced degree of control hunting, while avoiding deterioration of the control response.

The above object may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A hydraulic pressure control apparatus for use with a manually operable operating member, the hydraulic pressure control apparatus comprising:

a hydraulic pressure source device including a pressure control actuator operable according to a control amount, the hydraulic pressure source device being operable to generate an output pressure thereof on the basis of a fluid pressure corresponding to an operating force of the manually operable operating member, and on the basis of a control pressure controlled by the pressure control actuator; and an actuator control device including a final-control-value determining portion operable to determine a final value of the control amount, the actuator control device controlling the pressure control actuator according to the final value determined by the final-control-value determining portion, and wherein the final-control-value determining portion determines the final value of the control amount on the basis of at least two provisional control values selected from the group consisting of (a) at least one first provisional control value each of which is determined on the basis of at least one physical quantity including at least one of (i) an operating-state value representative of an operating state of the manually operable operating member and (ii) the output pressure of the hydraulic pressure source device, and (b) at least one second provisional control value each of which is determined on the basis of a combination of physical quantities which includes at least two of the operating-state value, the output pressure and the control pressure controlled by the pressure control actuator.

In the hydraulic pressure control apparatus constructed according to the above mode (1) of the present invention, the hydraulic pressure source device is operated to generate its output pressure on the basis of the fluid pressure corresponding to the operating force of the manually operable operating member, and the control pressure which is controlled by the pressure control actuator according to the control amount controlled by the actuator control device. The actuator control device is arranged to control the pressure control actuator, according to a predetermined rule, that is, so as to establish a predetermined relationship among the operating force or other operating-state value of the operating member, the control pressure controlled by the pressure control actuator and the output pressure of the hydraulic pressure source device. Therefore, when the two of these three physical quantities are determined, the remaining physical quantity can be determined on the basis of the determined two physical quantities and according to the predetermined relationship. Similarly, when one of the three physical quantities is determined, the remaining two physical quantities can be determined on the basis of the determined one physical quantity and according to the predetermined relationship.

In the present hydraulic pressure control apparatus, the final-control-value determining portion of the actuator control device is arranged to determine the final value of the control amount of the pressure control actuator, on the basis of at least two provisional control values selected from the group consisting of (a) at least one first provisional control value each determined on the basis of at least one physical quantity including at least one of the operating-state value of the manually operable operating member and the output pressure of the hydraulic pressure source device, and (b) at least one second provisional control amount each determined on the basis of two or three of the operating-state value, the output pressure and the control pressure controlled by the pressure control actuator. One of the three physical quantities which have the predetermined relationship as described above is the operating-state value representative of the operating state of the manually operable operating member. The operating-state value used to determine the final value of the control amount for controlling the pressure control actuator may include not only the operating force to be applied to the operating member, but also the operating stroke or amount of the operating member, and may consist of a combination of the operating force and stroke of the operating member when it is operated. Where the hydraulic pressure control device is used for a braking system for an automotive vehicle and includes a brake operating member as the manually operable operating member, at least one of the operating force and stroke of the operating member represents a braking force to be generated by the braking system, which braking force is desired by the vehicle operator.

For instance, a desired value of the control pressure can be determined on the basis of one of the operating-state value and the output pressure and according to the predetermined rule or relationship, so that the control amount for controlling the pressure control actuator to control the actual value of the control pressure can be determined on the basis of the determined desired value of the control amount.

The operating-state value of the operating member can be estimated on the basis of the output pressure of the hydraulic pressure source device and the control pressure controlled by the pressure control actuator. Therefore, the desired value of the control pressure can be determined on the estimated operating-state value, so that the control amount can be determined. Similarly, the output pressure can be estimated on the basis of the operating-state value and the control pressure, so that the control amount can be determined.

Further, the control amount can be determined on the basis of the operating-state value and the output pressure, and the control amount can be determined on the basis of all of the three physical quantities consisting of the operating-state value, the control pressure and the output pressure. Where the control amount is determined on the basis of the operating-state value and the output pressure, the control amount may be determined, for instance, on the basis of a control error of the actual value of the output pressure with respect to a desired value which is determined on the basis of the operating-state value and according to the predetermined rule or relationship.

The at least two provisional control values used by the final-control-value determining portion of the actuator control device to determine the final value of the control amount for the pressure control actuator may be selected from among the following six provisional control amounts:

1) a first provisional control amount determined on the basis of the operating-state value of the manually operable operating member;
2) a second provisional control amount determined on the basis of the output pressure of the hydraulic pressure source device and the control pressure controlled by the pressure control actuator;
3) a third provisional control amount determined on the basis of the output pressure;
4) a fourth provisional control amount determined on the basis of the output pressure and the stating-state value;
5) a fifth provisional control amount determined on the basis of the operating-state value and the control pressure; and
6) a sixth provisional control amount determined on the basis of the operating-state value, the control pressure and the output pressure.

In the above case, the final value of the control amount for controlling the pressure control actuator is determined by the final-control-value determining portion of the actuator control device, on the basis of the at least two provisional control values selected from among the above-indicated six provisional control amounts.

For instance, the final value of the control amount is determined on the basis of the first and third provisional control amounts. Where the pressure control actuator is controlled according to the final value of the control amount determined on the basis of the first provisional control amount, the pressure control actuator is relatively likely to suffer from a comparatively high degree of control hunting, while the control response is relatively high. Where the pressure control actuator is controlled according to the final value determined on the basis of the third provisional control amount, the pressure control actuator tends to suffer from a relatively low degree of control response, while the control hunting is less likely to be encountered. Where the pressure control actuator is controlled according to the final value of the control amount determined on the basis of the first and third provisional control amounts, the control hunting can be reduced, while reducing the deterioration of the control response.

(2) A hydraulic pressure control apparatus according to the above mode (1), wherein the hydraulic pressure source device includes:

a power-operated pressure source device electrically operable to pressurize a working fluid; and a master cylinder including a housing, and a pressurizing piston fluid-tightly and slidably received in the housing and cooperating with the housing to define a front pressurizing chamber on one of opposite sides thereof and a rear pressurizing chamber on the other side thereof, the pressurizing piston being advanced by the operating force of the manually operable operating member by an operator of the apparatus, to pressurize the working fluid in the front pressurizing chamber, and wherein the pressure control actuator is arranged to control a pressure of the working fluid in the rear pressurizing chamber, as the above-indicated control pressure.

In the hydraulic pressure control apparatus according to the above mode (2), the pressurizing piston receives the operating force of the operating member and a boosting or assisting force based on the control pressure in the rear pressurizing chamber of the master cylinder, so that the pressurizing piston is advanced by a sum of these forces. The advancing movement of the pressurizing piston causes the working fluid in the front pressurizing chamber to be pressurized to a pressure which is a sum of the fluid pressure corresponding to the operating force of the operating member and the control pressure controlled by the pressure control actuator. The thus generated fluid pressure in the front pressurizing chamber is the output pressure of the hydraulic pressure source device.

The power-operated pressure source device may include a pump device including a pump and an electric motor for driving the pump.

The pressure control actuator may be provided by the power-operated pressure source device. In this case, the output pressure of the power-operated pressure source device can be controlled to control the control pressure in the rear pressurizing chamber of the master cylinder, by controlling the amount of electric energy to be supplied from a driver circuit to the electric motor of the power-operated pressure source device. Alternatively, the pressure control actuator may include an electromagnetically operated pressure control valve operable to control the output pressure of the power-operated pressure source device to be applied to the pressurizing chamber. In this case, the control pressure in the rear pressurizing chamber can be controlled by the electromagnetically operated pressure control valve. The pressure control valve may be a linear control valve operable to control a pressure difference across the pressure control valve, according to an amount of electric current applied thereto. Alternatively, the pressure control valve may be a shut-off valve whose duty ratio is controllable by periodic application of an electric current thereto. Where the pressure control valve of the pressure control actuator is a linear control valve, the amount of electric current applied to the linear control valve is the control amount indicated above. Where the pressure control valve is a shut-off valve, the duty ratio, ON time or OFF time of the shut-off valve is the control amount.

The control amount of the pressure control actuator determines the fluid pressure in the rear pressurizing chamber, namely, the control pressure, which in turn determines the boosting force to be applied to the pressurizing piston of the master cylinder, in addition to the input force in the form of the operating force of the manually operable operating member. Thus, the input force is boosted by the boosting force into the output force of the master cylinder (hydraulic pressure source device). The control amount of the pressure control actuator is desirably determined such that the boosting ratio (servo ratio) which is a ratio of the output force to the input force is controlled to a predetermined value. However, the control amount may be determined otherwise. Regarding the input force of the pressurizing piston, it is noted that where a booster is provided between the master cylinder and the operating member, the input force to be applied to the pressurizing piston is the output force of the booster, which corresponds to the operating force of the operating member.

(3) A hydraulic pressure control apparatus according to the above mode (1) or (2), wherein the hydraulic pressure source device includes a master cylinder operable to generate a fluid pressure corresponding to the operating force of the manually operable operating member, and a pressure-increasing device disposed downstream of the master cylinder and operable to increase the fluid pressure generated by the master cylinder, the pressure-increasing device including the pressure control actuator.

(4) A hydraulic pressure control apparatus according to the above mode (3), wherein the pressure-increasing device includes a pump disposed downstream of the master cylinder, and an electric motor operable to drive the pump.

In the hydraulic pressure control apparatus according to the above mode (4), the pressure-increasing device functions as the pressure control actuator. For example, the amount of increase of the output pressure of the master cylinder by the pressure-increasing device can be controlled by controlling the amount of electric energy to be supplied from a driver circuit to the electric motor.

Where the pressure-increasing device includes a pressure control valve operable to control the delivery pressure of the pump, this pressure control valve functions as the pressure control actuator. In this case, the pressure of the pressurized fluid delivered from the pump is controlled to be higher than the pressure of the fluid pressurized by the master cylinder, by controlling the pressure control valve. The pressure control valve may be disposed in parallel with the pump, or in series with the pump. Where the pressure control valve is disposed in parallel with the pump, the pressure control valve may be disposed between the pump and a low-pressure source, or between the pump and the master cylinder. The pressure control valve may be either a linear control valve arranged to control a pressure difference across the valve, according to an amount of electric current applied thereto, or an electromagnetically operated shut-off valve whose duty ratio is controlled, as described above with respect to the pressure control valve in the apparatus according to the above mode (2).

(5) A hydraulic pressure control apparatus according to any one of the above modes (1)–(4), wherein the final-control-value determining portion of the actuator control device includes a portion operable to determine the final value of the control amount on the basis of the at least two provisional control values and weights of the at least two provisional control values.

In the hydraulic pressure control apparatus according to the above mode (5) wherein the final value of the control amount for the pressure control actuator is determined on the basis of not only the at least two provisional control values but also the weights given to those provisional control values, so that the pressure control actuator can be controlled with an adequate compromise between the control response and the freedom from the control hunting. For instance, the control response can be improved by increasing the weight to be given to the first provisional control amount indicated above, while the control hunting can be reduced by increasing the weight to be given to the second or third provisional control amount indicated above.

The weights are ratios by which the respective provisional control values are multiplied and whose sum is equal to 1. That is, the weights are relative values of importance of the provisional control values used to determine the final value. The weight of each provisional control value may be 0 or 1.

(6) A hydraulic pressure control apparatus according to the above mode (5), wherein the portion of the final-control-value determining portion includes a weight determining portion operable to determine the weight to be given to the provisional control value determined on the basis of the operating-state value of the manually operable operating member, such that the provisional control value determined on the basis of the operating-state value is larger when a rate of change of the operating-state value is higher than a predetermined threshold, than when the rate of change is not higher than the predetermined threshold.

For instance, the weight to be given to the provisional control value determined on the basis of the operating-state value of the operating member is increased when the operating speed of the operating member is higher than a predetermined threshold. When the operating speed is relatively high, the pressure control actuator is required to be controlled with a relatively high degree of control response to the operation of the operating member. The weight may be changed in steps or continuously as the rate of change of the operating-state value of the operating member is changed. The weight may be set to be 1.

The weight of the provisional control value determined on the basis of the operating-state value of the operating member may be set to be 1 when the rate of change of the operating-state value is higher than the predetermined threshold and when the operating-state value is larger than a predetermined threshold.

(7) A hydraulic pressure control apparatus according to any one of the above modes (1)–(6), further comprising:

an operating-state value detecting device operable to detect the operating-state value of the manually operable operating member;

a control-pressure detecting device operable to detect the control pressure controlled by the pressure control actuator; and an output-pressure detecting device operable to detect the output pressure of the hydraulic pressure source device, and wherein the final-control-value determining portion includes a provisional-control-value determining portion operable to determine the at least one first provisional control value on the basis of at least one of an output signal of the operating-state-value detecting device and an output signal of the output-pressure detecting device, and determine the at least one second provisional control value on the basis of the output signals of at least two of the operating-state-value detecting device, the control-pressure detecting device and the output-pressure detecting device, the actuator control device further including a defective-device determining portion operable on the basis of at least three provisional control values selected from among the at least one first provisional control value and the at least one second provisional control value which are determined by the provisional-control-value determining portion, the defective-device determining portion determining which one of the operating-state-value detecting device, the control-pressure detecting device and the output-pressure detecting device is defective.

All provisional control values determined on the basis of at least one of the output signals of the three detecting devices indicated above are theoretically substantially equal to each other while these detecting devices are all normally functioning. By comparing the at least three provisional control values, therefore, it is possible to detect a defective one of the detecting devices. Where the sensor diagnosing portion is operated on the basis of three provisional control values, and where one of the three detecting devices is defective, this detective detecting device can be detected, if the two of the three provisional control values are determined on the basis of the two physical quantities and are substantially equal to each other, while the remaining provisional control value is determined on the basis of the physical quantity different from the physical quantities used to determine the above-indicated two provisional control values. This limitation does not apply to the defective-device determining portion when it is operable on the basis of at least four provisional control values, the above-indicated limitation does not (8) A hydraulic pressure control apparatus according to the above mode (7), wherein the actuator control device includes a special final-control-value determining portion operable when at least one of the operating-state-value detecting device, the control-pressure detecting device and the output-pressure detecting device is diagnosed to be defective by the defective-device determining portion, the special final-control-value determining portion determining the final value of the control amount, on the basis of the at least two provisional control values except at least one provisional control value which is determined on the basis of the output signal of the at least one detecting device which has been diagnosed to be defective.

In the hydraulic pressure control apparatus according to the above mode (8), the pressure control actuator can be controlled even after at least one of the detecting devices is defective.

(9) A hydraulic pressure control apparatus according to the above mode (8), wherein the special final-control-value determining portion is operable to substantially zero a weight which is given to each of the at least one provisional control value which is determined on the basis of the output signal of the at least one detecting device which has been diagnosed to be defective by the defective-device determining portion.

In the apparatus according to the above mode (9) wherein the weight to be given to each provisional control value determined on the basis of the output signal of each defective detecting device is zeroed or set to be extremely small, the final value of the control amount is determined without taking into account each provisional control value determined on the basis of the output signal of each defective detecting device. Thus, the determination of the final value when at least one of the detecting devices is found defective can be effected according to the same formula as used when the detecting devices are all normal, such that the weights to be given to the individual provisional control values are suitably set depending upon whether any of the detecting devices is defective or not.

(10) A hydraulic pressure control apparatus according to any one of the above modes (1)–(9), wherein the final-control-value determining portion is operable to determine the final value of the control amount on the basis of at least two of a first provisional control amount determined on the basis of the operating-state value of the manually operable operating member, a second provisional control amount determined on the basis of the output pressure of the hydraulic pressure source device and the control pressure controlled by the pressure control actuator, and a third provisional control amount determined on the basis of the output pressure of the hydraulic pressure source device.

In the hydraulic pressure control apparatus according to the above mode (10), the final-control-value determining portion of the actuator control device is arranged to determine the final value of the control amount of the pressure control actuator on the basis of at least two provisional control values selected from among the first, second and third provisional control amounts.

However, the final-control-value determining portion may be arranged to determine the final value of the control amount on the basis of at least two provisional control values selected from among the above-indicated first and third provisional control amounts and a fourth provisional control amount determined on the basis of the operating-state value of the operating member and the output pressure of the hydraulic pressure source device.

(11) A hydraulic pressure control apparatus according to the above mode (10), wherein the final-control-value determining portion is operable to determine said final value of said control amount on the basis of said first, second and third provisional control amounts.

In the hydraulic pressure control apparatus according to the above mode (11), the final value of the control amount for the pressure control actuator is determined on the basis of the first, second and third provisional control amounts. However, the final value may be determined on the basis of the above-indicated first and third provisional control amounts and a fourth provisional control amount determined on the basis of the operating-state value of the operating member and the output pressure of the hydraulic pressure source device.

(12) A hydraulic pressure control apparatus according to the above mode (10) or (11), wherein the actuator control device includes:

a first provisional-control-amount determining portion operable to determine the first provisional control amount on the basis of an output signal of an operating-state-value detecting device operable to detect the operating-state value of the manually operable operating member;

a second provisional-control-amount determining portion operable to determine the second provisional control amount on the basis of an output signal of a control-pressure detecting device operable to detect the control pressure controlled by the pressure control actuator, and an output signal of an output-pressure detecting device operable to detect the output pressure of the hydraulic pressure source device;

a third provisional-control-amount determining portion operable to determine the third provisional control amount on the basis of the output signal of the output-pressure detecting device; and a sensor diagnosing portion operable to compare the first, second and third provisional control amounts, and thereby determine whether any one of the operating-state-value detecting device, the control-pressure detecting device and the output-pressure detecting device is defective.

By comparing the determined first, second and third provisional control amounts, it is possible to determine whether any one of the operating-state-value detecting device, control-pressure detecting device and output-pressure detecting device is defective.

For instance, it is possible to determine that all of the three detecting devices are normal, if a difference between the maximum and minimum ones of the first, second and third provisional control amounts is smaller than a predetermined threshold, and that any one of the three detecting devices is defective, if the above-indicated difference is not smaller than the threshold.

(13) A hydraulic pressure control apparatus according to the above mode (10) or (11), wherein the actuator control device includes:

a first provisional-control-amount determining portion operable to determine the first provisional control amount on the basis of an output signal of an operating-state-value detecting device operable to detect the operating-state value of the manually operable operating member;

a second provisional-control-amount determining portion operable to determine the second provisional control amount on the basis of an output signal of a control-pressure detecting device operable to detect the control pressure controlled by the pressure control actuator, and an output signal of an output-pressure detecting device operable to detect the output pressure of the hydraulic pressure source device;

a third provisional-control-amount determining portion operable to determine the third provisional control amount on the basis of the output signal of the output-pressure detecting device; and a defective-device determining portion operable on the basis of the first, second and third provisional control amounts, to determine which one of the operating-state-value detecting device, the control-pressure detecting device and the output-pressure detecting device is defective.

In the hydraulic pressure control apparatus according to the above mode (13), the first, second and third provisional control amounts are compared with each other, to determine which one of the three detecting devices is defective.

Where the second and third provisional control amounts are substantially equal to each other while the first provisional control amount is considerably different from the second and third provisional control amounts, for instance, it is possible to determine that the operating-state-value detecting device is defective, as described in detail in the DETAILED DESCRIPTION OF THE PREFERRED EMBODIMENTS. Where the first and third provisional control amounts are substantially equal to each other while the second provisional control amount is considerably different from the first and third provisional control amounts, it is possible to determine that the control-pressure detecting device is defective. In the other cases where the difference between the maximum and minimum ones of the three provisional control amounts is larger than a predetermined threshold, it is possible to determine that the output-pressure detecting device is defective.

(14) A hydraulic pressure control apparatus according to the above mode (13), wherein the actuator control device includes a special final-control-value determining portion operable, to determine the final value of the control amount for the pressure control actuator, on the basis of the first, second and third provisional control amounts except the provisional control amount which is determined on the basis of the output signal of the detecting device which has been diagnosed to be defective by the defective-device determining portion.

(15) A hydraulic pressure control apparatus according to the above mode (13) or (14), wherein the special final-control-value determining portion is operable to substantially zero a weight which is given to each of the provisional control amount which is determined on the basis of the output signal of the detecting device which has been diagnosed to be defective by the defective-device determining portion.

(16) A hydraulic pressure control apparatus according to any one of the above modes (1)–(15), wherein the actuator control device comprises:

a control-pressure detecting device operable to detect the control pressure controlled by the pressure control actuator; and a feedback control portion operable to feedback-control the pressure control actuator such that the control pressure as detected by the control-pressure detecting device coincides with a desired value corresponding to the final value of the control amount determined by the final-control-value determining portion.

(17) A hydraulic pressure control apparatus according to any one of the above modes (1)–(15), wherein the actuator control device comprises:

an output-pressure detecting device operable to detect the output pressure of the hydraulic pressure source device;

an operating-state-value detecting device operable to detect the operating-state value of the manually operable operating member;

a control-pressure estimating portion operable to estimate the control pressure controlled by the pressure control actuator, on the basis of the output pressure detected by the output-pressure detecting device and the operating-state value detected by the operating-state-value detecting device; and a feedback control portion operable to feedback-control the pressure control actuator such that the control pressure as estimated by the control-pressure estimating portion coincides with a desired value corresponding to the final value of the control amount determined by the final-control-value determining portion.

In the hydraulic pressure control apparatus according to the above mode (17) wherein the pressure control actuator is feedback-controlled on the basis of the estimated control pressure, the control hunting can be made smaller than in the apparatus according to the above mode (16) wherein the pressure control actuator is feedback-controlled on the basis of the detected control pressure.

(18) A hydraulic pressure control apparatus according to any one of the above modes (1)–(15), wherein the pressure control actuator includes a pressure control valve operable to control the control pressure according to an amount of electric current applied thereto as the control amount, and the actuator control device includes:
- a current detecting device operable to detect an amount of electric current actually flowing through the pressure control valve; and
- a feedback control portion operable to feedback-control the pressure control actuator such that the amount of electric current as detected by the current detecting device coincides with a desired value corresponding to the final value of the control amount determined by the final-control-value determining portion.

(19) A hydraulic pressure control apparatus for use with a manually operable operating member, the hydraulic pressure control apparatus comprising:
- a hydraulic pressure source device including a pressure control actuator operable according to a control amount, the hydraulic pressure source device being operable to generate an output pressure thereof on the basis of a fluid pressure corresponding to an operating force of the manually operable operating member, and on the basis of a control pressure controlled by the pressure control actuator;
- an operating-state-value detecting device operable to detect an operating-state value representative of an operating state of the manually operable operating member;
- an output-pressure detecting device operable to detect the output pressure of the hydraulic pressure source device;
- a control-pressure estimating device operable to estimate the control pressure controlled by the pressure control actuator, on the basis of the operating-state value detected by the operating-state-value detecting device and the output pressure detected by the output-pressure detecting device; and
- an actuator control device including a final-control value determining portion operable to determine a final value of the control amount, the actuator control device feedback-controlling the pressure control actuator such that the control pressure as estimated by the control-pressure estimating device coincides with a desired value corresponding to the final value of the control amount determined by the final-control-value determining portion,
- and wherein the final-control-value determining portion determines the final value of the control amount on the basis of at least one provisional control values selected from the group consisting of (a) at least one first provisional control value each of which is determined on the basis of at least one physical quantity including at least one of (i) an operating-state value representative of an operating state of the manually operable operating member and (ii) the output pressure of the hydraulic pressure source device, and (b) at least one second provisional control value each of which is determined on the basis of a combination of physical quantities which includes at least two of the operating-state value, the output pressure and the control pressure controlled by the pressure control actuator.

The hydraulic pressure control apparatus according to the above mode (19) may incorporate any of the technical features of the above modes (1)–(18).

(20) A hydraulic pressure control apparatus for use with a manually operable operating member, the hydraulic pressure control apparatus comprising:
- a hydraulic pressure source device including a pressure control actuator operable according to a control amount, the hydraulic pressure source device being operable to generate an output pressure thereof on the basis of a fluid pressure corresponding to an operating force of the manually operable operating member, and on the basis of a control pressure controlled by the pressure control actuator; and
- an actuator control device including a control-amount determining portion operable to determine the control amount on the basis of at least two of (a) an operating-state value representative of an operating state of the manually operable operating member, (b) the output pressure of the hydraulic pressure source device, and (c) the control pressure controlled by the pressure control actuator, the actuator control device controlling the pressure control actuator according to the control amount determined by the control-amount determining portion.

The hydraulic pressure control apparatus according to the above mode (20) may incorporate any of the technical features of the above modes (1)–(19).

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which:

FIG. 5 is a view illustrating a portion of the hydraulic pressure control apparatus;

DETAILED DESCRIPTION OF THE PREFERRED EMBODIMENTS

Figure 1:
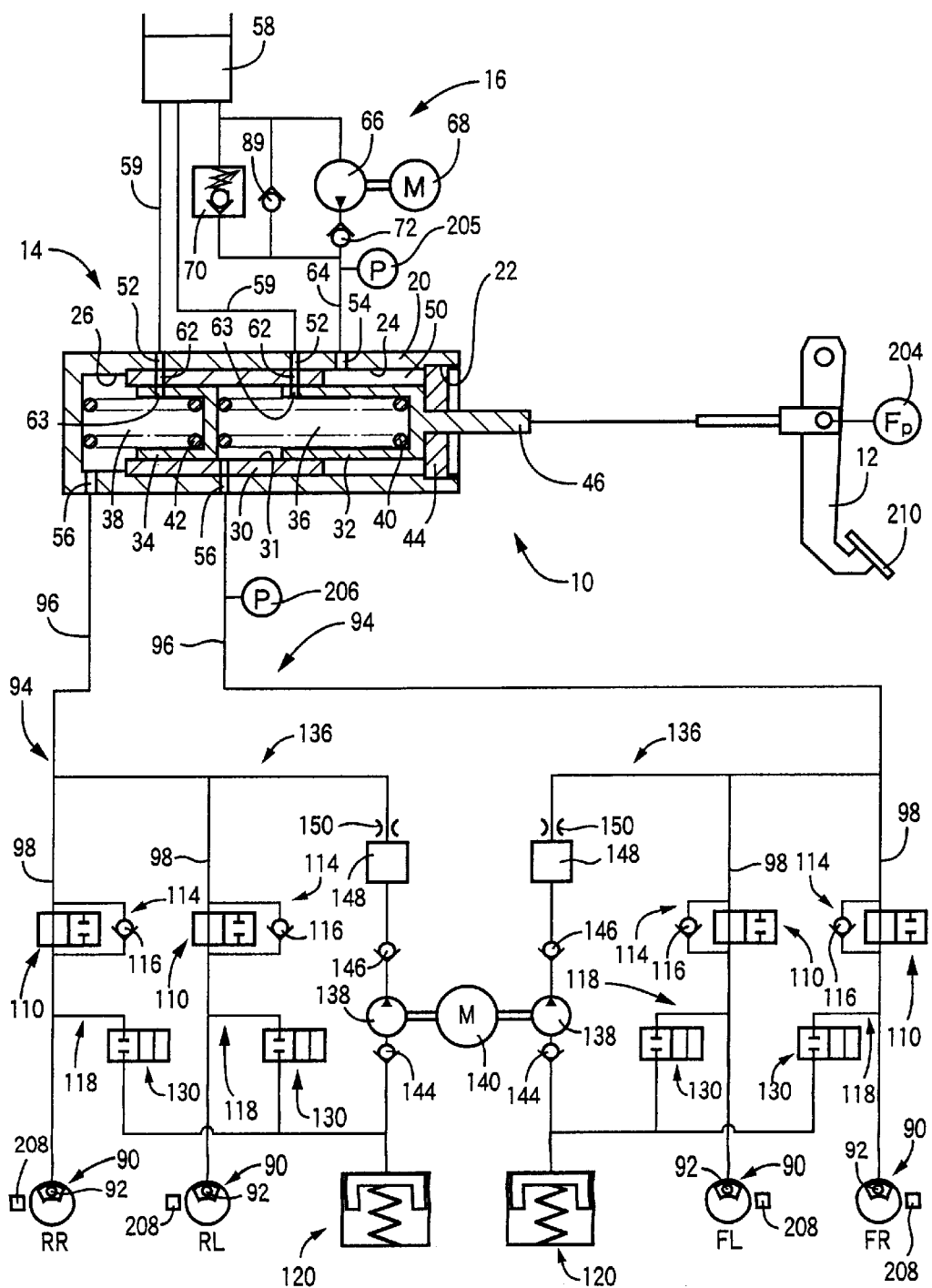
FIG. 1 is a hydraulic circuit diagram showing a braking system including a hydraulic pressure control apparatus constructed according to a first embodiment of this invention.

Referring first to FIG. 1, there is shown a braking system including a hydraulic pressure control apparatus according to a first embodiment of the present invention. The hydraulic pressure control apparatus includes a hydraulic pressure source device indicated generally at 10 in FIG. 1. The hydraulic pressure control apparatus 10 includes a master cylinder 14 arranged to generate a fluid pressure corresponding to an operating force acting on a brake pedal 12, and further includes a power-operated pressure source device 16. The braking system is adapted for use on an automotive vehicle having four wheels FL, FR, RL, RR.

The master cylinder 14 has a cylindrical housing 20 which is open at one of its opposite ends and closed at the other end. The housing 20 has a first, a second and a third cylinder bore 22, 24, 26, which are formed in the order of description from the open end toward the closed end of the housing 20 and the diameters of which decrease in this order.

In the second cylinder bore 24, there is substantially fluid-tightly fitted a sleeve 30 such that the sleeve 30 is held in abutting contact, at its end on the side of the closed end of the housing 20, with a shoulder surface formed between the second and third cylinder bores 24, 26. The sleeve 30 is held in this position by a fixing member (not shown), that is, prevented from moving relative to the housing 20. The sleeve 30 has an inner circumferential surface or bore 31 in which are fitted a first pressurizing piston 32 and a second pressurizing piston 34 in series with each other. Each of the two pressurizing pistons 32, 34 is a cylindrical member which is open and closed at its opposite ends, respectively. The pressurizing pistons 32, 34 are fitted in the bore 31 substantially fluid-tightly and slidably. The pressurizing pistons 32, 34 cooperate with the sleeve 30 and the housing 20 to define a first front pressurizing chamber 36 in front of the first pressurizing piston 32, and a second front pressurizing chamber 38 in front of the second pressurizing piston 34. The two pressurizing pistons 32, 34 are held at their fully retracted positions of FIG. 1, under biasing actions of respective return springs 40, 42 disposed in the respective first and second front pressurizing chambers 36, 38. The initial length and initial load of the spring 40 disposed in the first front pressurizing chamber 36 are determined by a member not shown. The initial length determines a distance of elongation of the spring 40 from the initial position when a load is released from the spring 40. These initial length and load of the spring 40 and the fully retracted position of the first pressurizing piston 32 determined by a closure member 44 determine the fully retracted position of the second pressurizing piston 32.

An auxiliary piston 46 extends rearwards from the rear end face of the first pressurizing piston 32, through the closure member 44 such that the auxiliary piston 46 is substantially fluid-tightly slidable relative to the closure member 44. The auxiliary piston 46 is connected at its rear end to the brake pedal 12, so that the first pressurizing piston 32 is advanced as the brake pedal 12 is operated. With an advancing movement of the first pressurizing piston 32, masses of a working fluid in the first and second front pressurizing chambers 36, 38 are pressurized to pressure values which are substantially equal to each other.

The closure member 44, the first pressurizing piston 32 and the housing 20 cooperate with each other to define a rear pressurizing chamber 50. A fluid pressure in the rear pressurizing chamber 50 generates an assisting or boosting force acting on the first pressurizing piston 32 in the advancing direction.

Thus, the first pressurizing piston 32 is adapted to receive both the operating force applied by the operator of the braking system to the brake pedal 12, and the boosting force based on the fluid pressure in the rear pressurizing chamber 50, so that a fluid pressure corresponding to a sum of the brake operating force and the boosting force is generated in the first front pressurizing chamber 36.

The housing 20 has two reservoir ports 52, one pressure-increasing port 54, and two brake-cylinder ports 56.

To the two reservoir ports 52, there are connected respective two fluid passages 59 extending from a reservoir 58. The sleeve 30 has two communicating holes 62 formed therethrough in its radial direction, and the first and second pressurizing pistons 32, 34 have respective communicating holes 63 formed therethrough in their radial direction. The two reservoir ports 52 are aligned with the respective communicating holes 62 and the respective communicating holes 63, for fluid communication of the front pressurizing chambers 36, 38 with the reservoir 58, when the pressurizing pistons 32, 34 are placed at their fully retracted positions of FIG. 1. When the pressurizing pistons 32, 34 are advanced a short distance from the fully retracted positions, the communicating holes 63 are closed by the inner circumferential surface 31 of the sleeve 30, so that the communicating holes 63 are disconnected from the reservoir ports 52, whereby the front pressurizing chambers 36, 38 are disconnected from the reservoir 58. In this state, the fluid pressures in the front pressurizing chambers 36, 38 can be raised by advancing movements of the pressurizing pistons 32, 34.

The position of the single pressure-increasing port 54 in the axial direction of the housing 20 is determined so that the port 54 is held in communication with the rear pressurizing chamber 50. The pressure-increasing port 54 is connected to the power-operated pressure source device 16 through a fluid passage 64. The power-operated pressure source device 16 includes a pump 66, a pump drive electric motor 68 for driving the pump 66, and a pressure control valve 70. The pump 66 is operated by the electric motor 68 to pressurize the working fluid received from the reservoir 58, and deliver the pressurized fluid to the rear pressurizing chamber 50. The pressure of the pressurized fluid delivered to the rear pressurizing chamber 50 is controlled by the pressure control valve 70. A check valve 72 is provided on the delivery side of the pump 66, to prevent a flow of the pressurized fluid back to the pump 66.

Figure 2A:
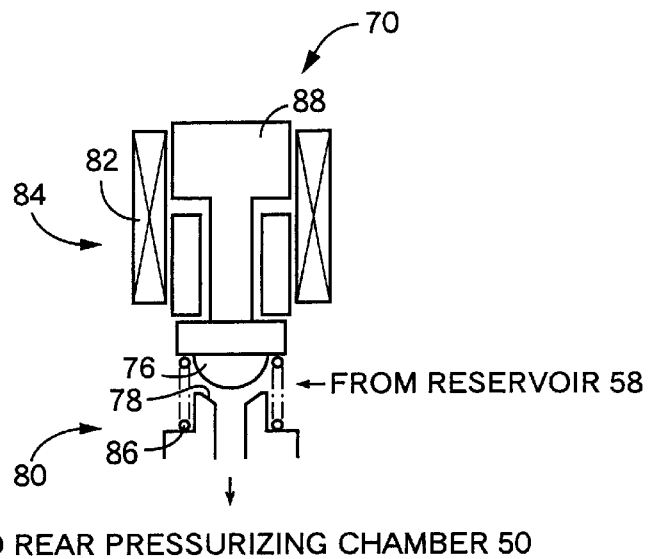
FIGS. 2A and 2B are cross sectional views of a pressure control valve included in the hydraulic pressure control apparatus of FIG. 1.
Figure 2B:
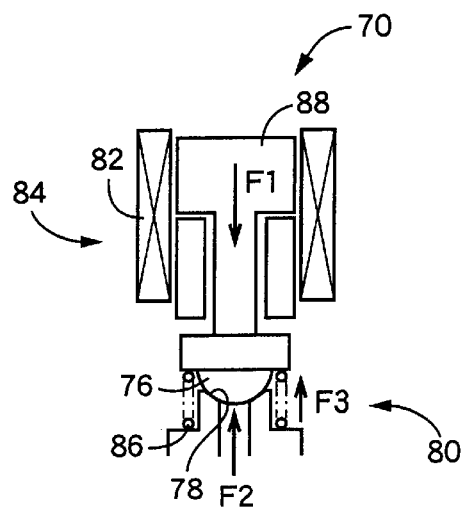

As shown in FIGS. 2A and 2B, the pressure control valve 70 includes a seating valve 80, and a solenoid device 84 for controlling the seating valve 80. The seating valve 80 includes a valve member 76 and a valve seat 78 which are arranged to control flows of the fluid between the rear pressurizing chamber 50 and the reservoir 58. The solenoid device 84 includes a solenoid coil 82 for generating an electromagnetic force to control a movement of the valve member 76 relative to the valve seat 78.

When the pressure control valve 70 is placed in an OFF state in which the coil 82 is in a de-energized state, the seating valve 80 is held in its open state in which the valve 76 is held apart from the valve seat 78 with an elastic force of a spring 86, as shown in FIG. 2A. The pressure control valve 70 placed in the OFF state permits the flows of the fluid between the rear pressurizing chamber 50 and the reservoir 58, so that the fluid pressure in the rear pressurizing chamber 50 is held at a level substantially equal to the atmospheric pressure, even when the volume of the rear pressurizing chamber 50 changes with a movement of the first pressurizing piston 32.

When the pressure control valve 70 is placed in an ON state in which the coil 82 is in an energized state, on the other hand, an armature 88 which carries the valve member 76 is attracted toward the valve seat 78, with an electromagnetic force F1 generated by energization of the coil 82. The valve member 76 receives the electromagnetic force F1, a force F2 based on the fluid pressure in the rear pressurizing chamber 50, and the elastic force F3 of the spring 86. Described more precisely, the force F2 is based on a difference between the fluid pressures in the rear pressurizing chamber 50 and the reservoir 58, namely, a pressure difference across the pressure control valve 70. The electromagnetic force F1 acts on the valve member 76 in a direction (valve closing direction) in which the valve member 76 is seated on the valve seat 78, while a sum of the force F2 and the elastic force F3 act on the valve member 76 in the opposite direction (valve opening direction) in which the valve member 76 is moved away from the valve seat 78. The force F2 is represented by the fluid pressure in the rear pressurizing chamber 50 and an effective pressure-receiving surface area of the valve member 76.

The pressure control valve 70 is held in its closed state as long as an equation F2≦F1−F3 is satisfied while the solenoid coil 82 is in the energized state. In this closed state, the fluid pressure in the rear pressurizing chamber 50 is increased.

The pressure control valve 70 is held in the open state with the valve member 76 held apart from the valve seat 78 as long as an equation F2>F1−F3 is satisfied. In this open state, the fluid pressure in the rear pressurizing chamber 50 is reduced.

As described above, the relative position of the valve member 76 and the valve seat 78 is determined by the three forces F1, F2 and F3 indicated above. By controlling the electromagnetic force F1, the relative position of the valve member 76 and seat 78 can be controlled to regulate the fluid pressure in the rear pressurizing chamber 50.

The power-operated pressure source device 16 includes a check valve 89 disposed between the rear pressurizing chamber 50 and the reservoir 58, in parallel connection with the pump 66 and the pressure control valve 70. The check valve 89 permits a flow of the fluid in a direction from the reservoir 58 toward the rear pressurizing chamber 50, and inhibits a flow of the fluid in the reverse direction. This check valve 89 cooperates with the normally open pressure control valve 70 to permit a rapid supply of the working fluid from the reservoir 58 to the rear pressurizing chamber 50, so as to prevent reduction of the fluid pressure in the chamber 50 below the atmospheric level, even when the volume of the chamber 50 is rapidly increased due to an abrupt operation of the brake pedal 12.

The present braking system has two brake-application sub-systems consisting of a front sub-system and a rear sub-system. These front and rear sub-systems include the respective brake-cylinder ports 56 which are connected to respective pairs of wheel brake cylinders 92 of front and rear wheel brakes 90.

Since the front and rear sub-systems of the braking system are identical with each other, only the front sub-system for the front wheel brakes 90 will be described by way of example, and a redundant description of the rear sub-system will not be provided.

The first front pressurizing chamber 36 is connected to the wheel brake cylinders 92 for front left and right wheels FL, FR of the vehicle, through the brake-cylinder port 56 and a main fluid passage 94. The main fluid passage 94 extending from the first front pressurizing chamber 36 consists of a single common passage 96 connected to the brake-cylinder port 56, and two branch passages 98 connected to the wheel brake cylinders 92.

A pressure-holding valve 110 in the form of a normally open solenoid-operated shut-off valve is provided in each of the two branch passages 98. The pressure-holding valve 110 is brought into its closed state upon energization of its solenoid coil 112 (indicated in FIG. 3). The pressure-holding valve 110 is provided with a by-pass passage 114 which permits a return flow of the fluid from the wheel brake cylinder 92 toward the first front pressurizing chamber 36.

A pressure-reducing passage 118 is connected at one end thereof to a portion of the branch passage 98 between the pressure-holding valve 110 and the wheel brake cylinder 92, and at the other end to a reservoir 120. A pressure-reducing valve 130 is provided in the pressure-reducing passage 118 in the form of a normally closed solenoid-operated shut-off valve. The pressure-reducing valve 130 is brought into its open state upon energization of its solenoid coil 132 (FIG. 3), permitting a flow of the fluid from the wheel brake cylinder 92 to the reservoir 120.

A pump passage 136 is connected at its one end to the reservoir 120 and at the other end to a portion of the main fluid passage 94 between the pressure-holding valve 110 and the brake-cylinder port 56. A pump 138 is provided in the pump passage 136. The two pumps 138 provided in the pump passages 136 in the front and rear sub-systems are both driven by a common pump drive electric motor 140.

Each pump passage 136 is provided with two check valves 144, 146 on the opposite sides of the pump 138. A damper 148 and a flow restrictor I the form of an orifice 150 are connected in series with the check valve 146 disposed on the delivery side of the pump 138. The damper 148 and the orifice 150 function to reduce pressure pulsation of the pressurized fluid delivered from the pump 138.

Figure 3:
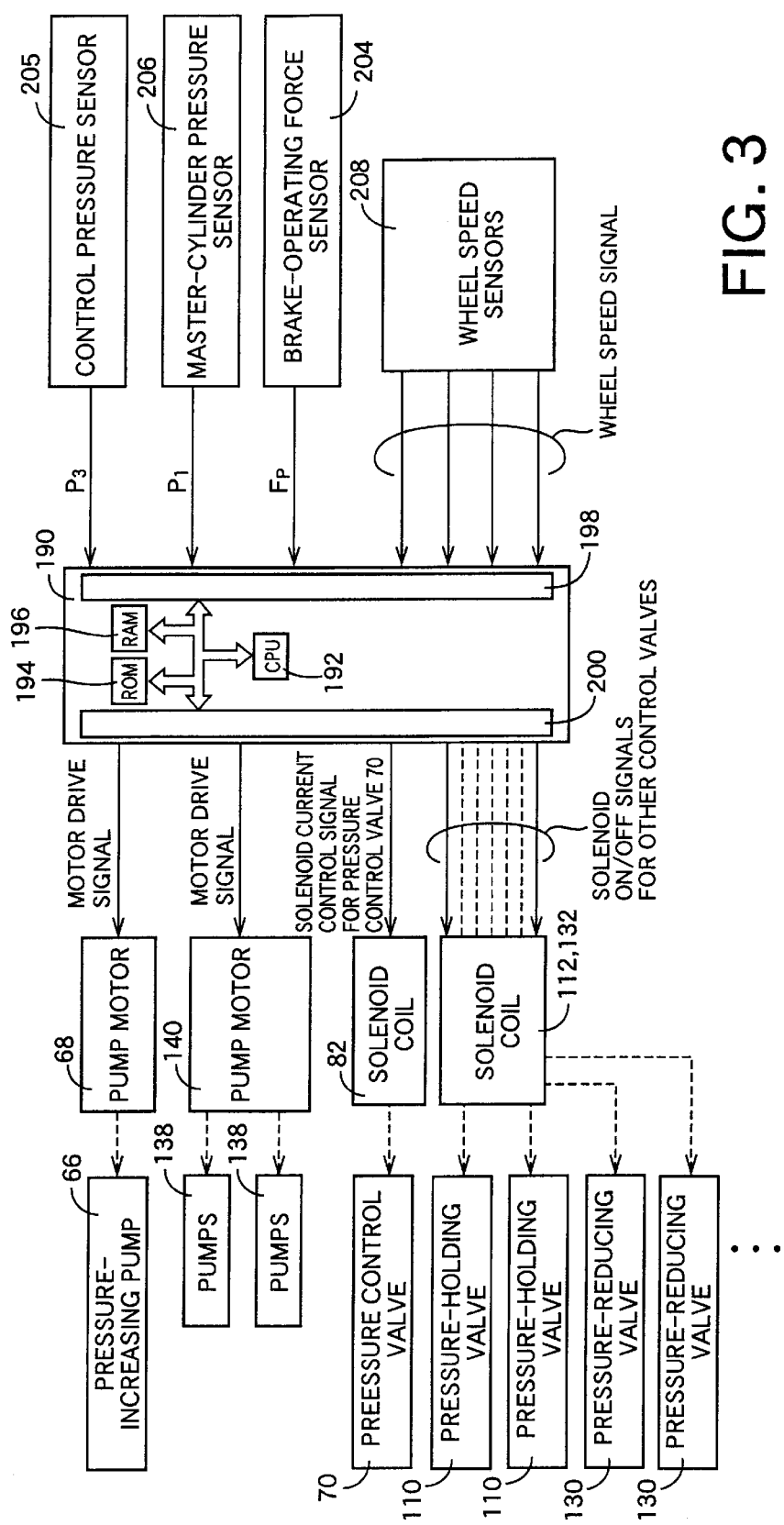
FIG. 3 is a block diagram illustrating an electrical arrangement of the hydraulic pressure control apparatus of FIG. 1.

As shown in FIG. 3, the present braking system includes an electronic control unit (hereinafter abbreviated as "ECU") 190. The hydraulic pressure control apparatus according to the present first embodiment includes this ECU 190 as well as the hydraulic pressure source device 10. The ECU 190 is constituted principally by a computer which incorporates a central processing unit (CPU) 192, a read-only memory (ROM) 194, a random-access memory (RAM) 196, an input portion 198 and an output portion 200. To the input portion 198, there are connected a brake-operating force sensor 204, a control pressure sensor 205, a master-cylinder pressure sensor 206, and four wheel speed sensors 208. The brake-operating force sensor 204 is arranged to detect a brake operating force $F_P$ acting on the brake pedal 12. In this embodiment, the brake-operating force sensor 204 is adapted to detect an operating force which acts on a pedal pad 210 of the brake pedal 12. The control pressure sensor 205 is arranged to detect the fluid pressure in the rear pressurizing chamber 50. The master-cylinder pressure sensor 206 is arranged to detect the fluid pressure in the first front pressurizing chamber 36. The wheel speed sensors 208 are arranged to detect the rotating speeds of the wheels FL, FR, RL, RR of the vehicle.

To the output portion 200, there are connected the solenoid coil 84 of the pressure control valve 70, the pump motor 68 for the pump 66, and the pump motor 140 for the pumps 138, commonly for the front and rear sub-systems. To the output portion 200, there are further connected the solenoid coils 112 of the pressure-holding valves 110, and the solenoid coils 132 for the pressure-reducing valves 130, for the individual wheels FL, FR, RL, RR of the vehicle. The output portion 200 incorporates driver circuits for the pump motors 68, 140 and the solenoid coils 82, 112, 132.

Figure 9:
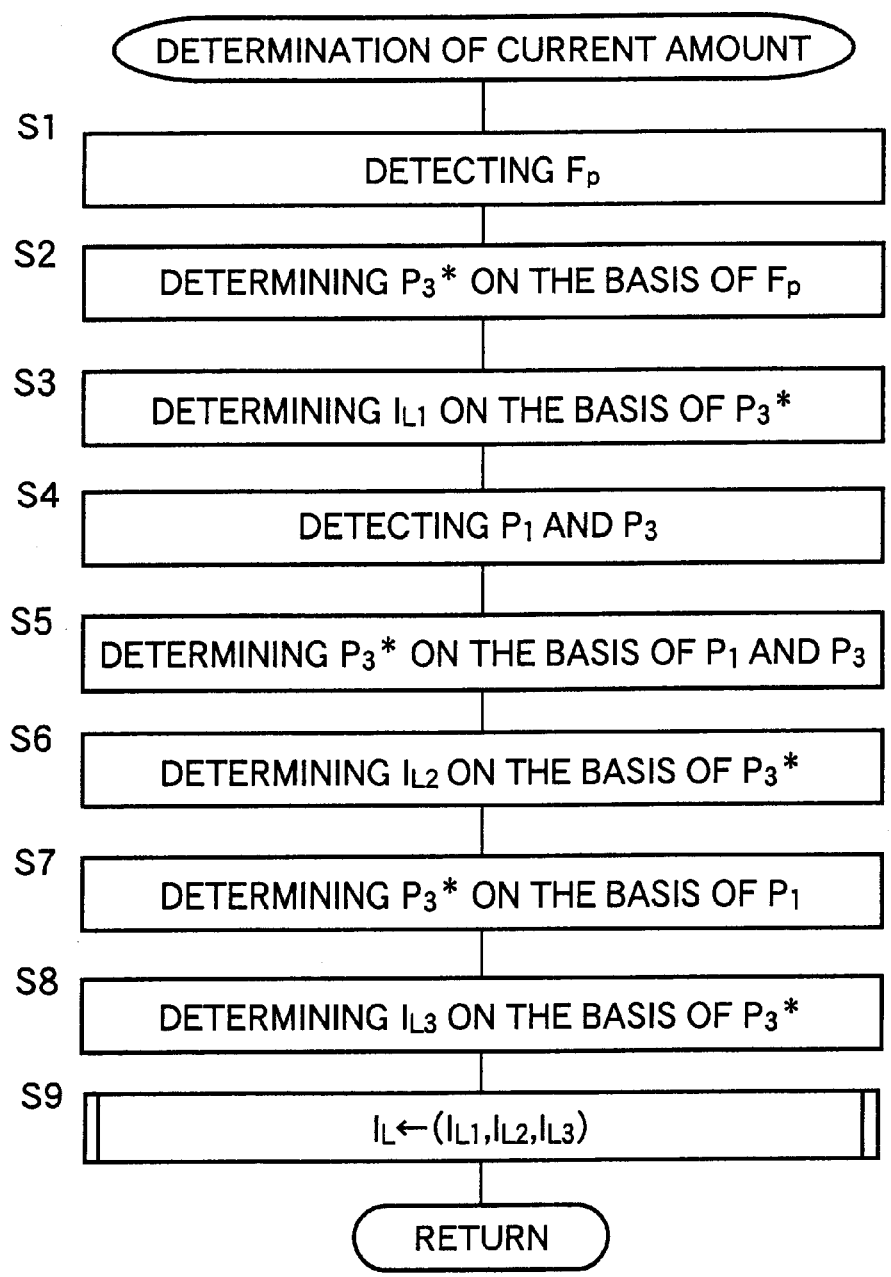
FIG. 9 is a flow chart illustrating a current determining routine executed according to a control program stored in the ROM of the hydraulic pressure control apparatus, for determining the amount of electric current.

The ROM 194 stores various control programs such as a control program for executing a current determining routine illustrated in the flow chart of FIG. 9, and various data tables such as a data tape representative of a predetermined relationship between a desired fluid pressure in the first front pressurizing chamber 36 and the brake operating force. The CPU 192 operates according to the control programs stored in the ROM 194 while utilizing a temporary data storage function of the RAM 196.

In the present hydraulic pressure control apparatus, the boosting or assisting force to be applied to the first pressurizing piston 32 is controlled so that a servo ratio Rs of the hydraulic pressure source device 10 is held constant. The servo ratio Rs is a ratio of the input force to be applied to the first pressurizing piston 32 to the output force to be generated by the piston 32. Namely, the fluid pressure in the rear pressurizing chamber 50, that is, the control value of the pressure control valve 70, is determined so that the fluid pressure $P_1$ in the first front pressurizing chamber 26 (hereinafter referred to as "master cylinder pressure") linearly increases with an increase in the brake operating force $F_P$ acting on the brake pedal 12, as indicated in the graph of FIG. 4.

Figure 4:
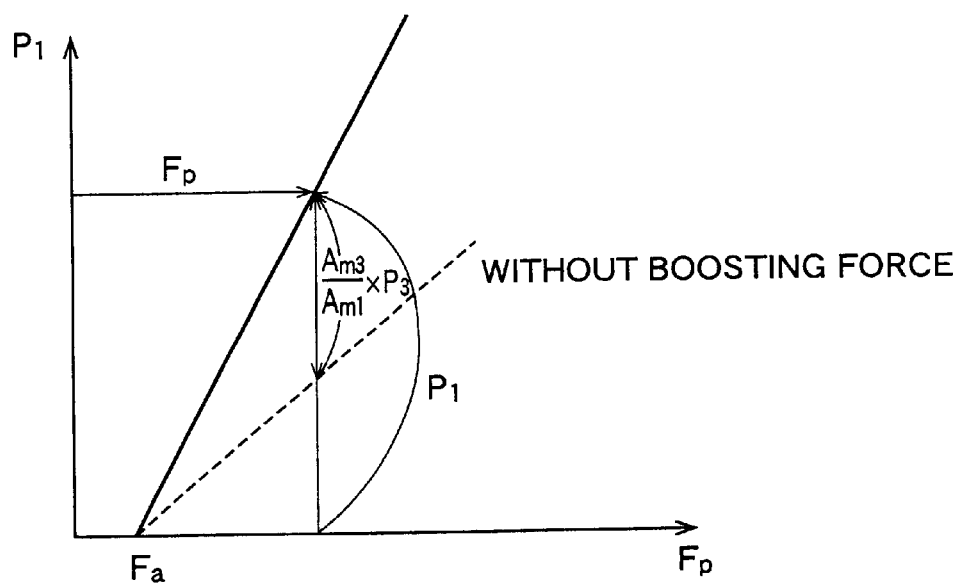
FIG. 4 is a graph indicating a relationship between an output hydraulic pressure of a hydraulic pressure source device controlled in the hydraulic pressure control apparatus and a brake operating force.

In the presence of the return springs 40, 42, the master cylinder pressure $P_1$ is not raised until the brake operating force $F_P$ is increased to a predetermined value Fa, as indicated in the graph of FIG. 4. While the boosting force based on the fluid pressure in the rear pressurizing chamber 50 is zero, the advancing movement of the pressurizing piston 32 is initiated to pressurize the fluid in the pressurizing chamber 36 when the brake operating force $F_P$ has become larger than the set load of the return spring 40. By suitably controlling the boosting force, the master cylinder pressure $P_1$ can be increased from zero when the brake operating force $F_P$ is increased from zero. In the present embodiment, however, the pressure control valve 70 is controlled such that the increase of the master cylinder pressure $P_1$ is initiated when the brake operating force $F_P$ has been increased to the predetermined value Fa, so that the operating feel of the brake pedal 12 is kept constant irrespective of whether the fluid pressure in the rear pressurizing chamber 50 is controlled or not.

It is noted that the pressure control valve 70 may be controlled to initiate the increase of the master cylinder pressure $P_1$ when the brake operating force $F_P$ is increased from zero, as indicated above, or when the brake operating force $F_P$ has been increased to a predetermined value other than the value Fa indicated above.

While the boosting force is zero with the fluid pressure in the rear pressurizing chamber 50 being equal to the atmospheric pressure), the master cylinder pressure $P_1$ is increased as indicated by a broken line in FIG. 4. In the present embodiment, however, the boosting force based on the fluid pressure in the chamber 50 is controlled so that the master cylinder pressure $P_1$ is increased as indicated by solid line in FIG. 4. The boosting force corresponds to a difference between the master cylinder pressure values represented by the broken and solid lines, and is determined by the fluid pressure in the rear pressurizing chamber 50.

In the present embodiment, an amount of electric current $I_L$ to be actually applied to the pressure control valve 70 (that is, a final control value of the valve 70) is determined on the basis of a first provisional current amount (first provisional control amount) $I_{L1}$ determined on the basis of the brake operating force $F_P$, a second current amount (second provisional control amount) $I_{L2}$ determined on the basis of the master cylinder pressure $P_1$ and a control pressure $P_3$, and a third current amount (third provisional control amount) $I_{L3}$ determined on the basis of the master cylinder pressure $P_1$.

Referring to FIG. 5 schematically showing a portion of the hydraulic pressure source device 10, the first pressurizing piston 32 has a surface area $A_{m1}$ which receives the fluid pressure $P_1$ in the first front pressurizing chamber 36, and a surface area $A_{m3}$ which receives the fluid pressure $P_3$ in the rear pressurizing chamber 50. The input force to be applied to the first pressurizing piston 32 upon operation of the brake pedal 12 with the brake operating force $F_P$ at a lever ratio $R_P$ of the brake pedal 12 is represented by $F_P \times Rp$. However, a portion of this input force which contributes to an advancing movement of the piston 32 is represented by $(F_P - Fa) \times Rp$.

A relationship among $A_{m1}$, $A_{m3}$, $P_1$, $P_3$, $F_P$, Fa and Rp is represented by an equation (1) indicated in FIG. 5, and the servo ratio Rs indicated above is represented by an equation (2) in FIG. 5.

An equation (3) also indicated in FIG. 5 is obtained by replacing the value $(A_{m1} \times P_1)$ in the equation (1) with the same value as obtained from the equation (2), and by replacing the fluid pressure $P_3$ in the rear pressurizing chamber 50 with a desired value $P_3^*$ thereof when the actual brake operating force $F_P$ is represented by an output signal of the brake-operating force sensor 204. The amount of electric current to be applied to the pressure control valve 70 can be obtained on the basis of the desired fluid pressure $P_3^*$ in the rear pressurizing chamber 50, which can be obtained on the basis of the detected actual brake operating force $F_P$ and according to the equation (3). The amount of electric current thus obtained is the first provisional current amount $I_{L1}$.

Figure 6:
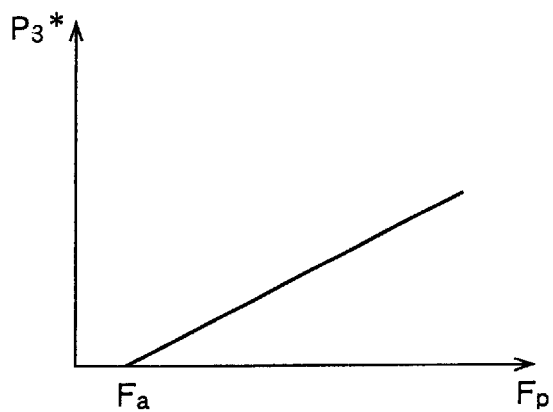
FIG. 6 is a graph indicating a relationship between a desired fluid pressure and the brake operating force, which relationship determines the desired fluid pressure on the basis of the brake operating force.
Figure 8:
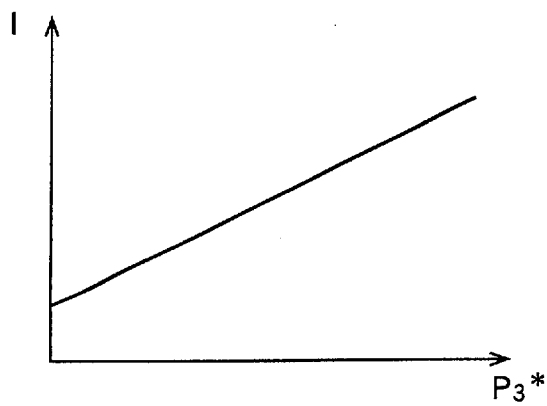
FIG. 8 is a graph indicating a relationship which is represented by a data map stored in a ROM of the hydraulic pressure control apparatus, and which is used to determine an amount of electric current to be applied to a pressure control valve, on the basis of the determined desired fluid pressure.

A relationship between the brake operating force $F_P$ and the desired fluid pressure $P_3^*$ in the rear pressurizing chamber 50 is shown in FIG. 6 by way of example, and a predetermined relationship between the desired fluid pressure $P_3^*$ and the amount of electric current I to be actually applied to the pressure control valve 70 is shown in FIG. 8 by way of example. The predetermined relationship of FIG. 8 is represented by a data map stored in the ROM 194. In this respect, it is noted that the fluid pressure $P_3$ in the rear pressurizing chamber 50 is increased with an increase in the amount of electric current I to be applied to the pressure control valve 70, in a predetermined relationship between $P_3$ and I, so that the amount of electric current I can be determined on the basis of the desired value $P_3^*$ of the fluid pressure $P_3$. The predetermined relationship is represented by an equation (6) also indicated in FIG. 6. As indicated in the graph of FIG. 8, the amount of electric current I is larger than zero when the desired fluid pressure $P3^*$ is equal to the atmospheric pressure. This is due to the set load of the return spring 86. Namely, the valve member 76 must be seated on the valve seat 78 against the biasing force of the return spring 86, for the bringing the normally open pressure control valve 70 to its closed state.

An equation (4) also indicated in FIG. 5 is obtained by replacing the value $(F_P - Fa) \times Rp$ in the equation (3) with the same value as obtained from the equation (1). The desired fluid pressure $P_3^*$ in the rear pressurizing chamber 50 can be obtained by replacing the fluid pressures $P_1$ and $P_3$ in the equation (4) with values as represented by output signals of the master-cylinder pressure sensor 206 and the control pressure sensor 205. The second provisional current amount $I_{L2}$ of the pressure control valve 70 is obtained on the basis of the thus obtained desired fluid pressure $P_3^*$.

Figure 7:
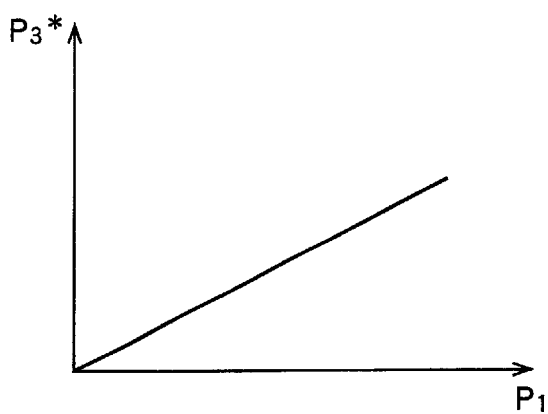
FIG. 7 is a graph indicating a relationship between the determined desired fluid pressure and a master cylinder pressure in the hydraulic pressure control apparatus.

An equation (5) indicated in FIG. 5 is obtained by replacing the value $(F_P-Fa)\times Rp$ in the equation (1) with the same value as obtained from the equation (2), and by replacing the fluid pressure $P_3$ with the desired value $P_3^*$. The desired fluid pressure value P3* can obtained by replacing the fluid pressure P1 in the equation (5) with a value as represented by the output signal of the master-cylinder pressure sensor 206. The third provisional current amount $I_{L3}$ of the pressure control valve 70 is obtained on the basis of the thus obtained desired fluid pressure $P_3^*$. A relationship between the master cylinder pressure P1 in the first front pressurizing chamber 36 and the desired fluid pressure P3* in the rear pressurizing chamber 50 is indicated in the graph of FIG. 7 by way of example.

As described above, the desired value $P_3^*$ of the fluid pressure $P_3$ in the rear pressurizing chamber 50 can be obtained on the basis of the brake-operating force $F_P$ and according to the equation (3), on the basis of the master cylinder pressure $P_1$ and the control pressure $P_3$ and according to the equation (4), and on the basis of the master cylinder pressure $P_1$ and according to the equation (5). The amount of electric current to be applied to the pressure control valve 70 can be determined on the basis of the desired fluid pressure values $P_3^*$ obtained according to the equations (3), (4) and (5). In the present embodiment, however, the final current amount $I_L$ to be applied to the pressure control valve 70 is determined on the basis of the three provisional current amounts $I_{L1}$, $I_{L2}$ and $I_{L3}$ obtained from the above equations (3)–(5), respectively. The final current amount $I_L$ is represented by the following equation:

$$I_L = \alpha \cdot I_{L1} + \beta \cdot I_{L2} + \gamma \cdot I_{L3}$$

wherein coefficients $\alpha$, $\beta$ and $\gamma$ are determined so as to satisfy the following equation:

$$\alpha + \beta + \gamma = 1$$

In the present embodiment, the coefficients $\alpha$, $\beta$ and $\gamma$ are normally set to be ½, ½ and 0,respectively. Where the coefficient $\alpha$ which determines the weight of the first provisional current amount $I_{L1}$ obtained based on the brake operating force $F_P$ is relatively large, the hydraulic pressure control apparatus exhibits a relatively high response to a change in the brake operating force $F_P$ is relatively high, but suffers from a relatively large degree of control hunting. Where the coefficient $\beta$ which determines the weight of the second provisional current amount $I_{L2}$ obtained based on the master cylinder pressure $P_1$ and the control pressure $P_3$ is relatively large, the hydraulic pressure control apparatus exhibits a relatively low response to the change in the brake operating force $F_P$, but suffers from a relatively small degree of control hunting. Where the final current amount $I_L$ is determined on the basis of both of the first and second provisional current amounts $I_{L1}$, and $I_{L2}$, that is, where the coefficients $\alpha$ and $\beta$ are both set to be ½, as indicated above, the control hunting of the apparatus can be reduced while reducing the deterioration of the control response.

The brake-operating force sensor 204, control pressure sensor 205 and master-cylinder pressures sensor 206 can be diagnosed for any abnormality or defect thereof, by comparing the determined three provisional current values $I_{L1}$, $I_{L2}$ and $I_{L3}$. If any one of the sensors 204–206 is found abnormal or defective by the comparison of the three provisional current amounts, the final current amount $I_L$ is determined on the basis of the provisional current amount or amounts which is/are obtained on the basis of the output signal or signals of the normal sensor or sensors. That is, each of the coefficients $\alpha$, $\beta$ and $\gamma$ is zeroed if the corresponding one or ones of the sensors 204–206 is/are diagnosed to be abnormal.

When the brake pedal 12 is operated at a relatively high speed, or when the operating amount of the brake pedal 12 is relatively large, the coefficient $\alpha$ is set to be 1,so that the final current amount $I_L$ is determined by only the first provisional current value $I_{L1}$ which is determined by the brake operating force $F_P$. In this case, the hydraulic pressure control apparatus exhibits a high degree of control response, so that the braking system is operated in a manner as represented by the manner of operation of the brake pedal 12 by the vehicle operator.

The hydraulic pressure control apparatus according to the present embodiment of the invention is arranged to feedback-control the pressure control valve 70 such that the fluid pressure $P_3$ in the rear pressurizing chamber 50 as detected by the control pressure sensor 205 coincides with the desired value $P_3^*$ corresponding to the determined final current amount $I_L$.

The final current amount $I_L$ to be applied to the pressure control valve 70 is determined according to the current determining routine illustrated in the flow chart of FIG. 9. This current determining routine is repeatedly executed with a predetermined cycle time. Each cycle of execution of the routine is initiated with step S1 to detect the brake operating force $F_P$ on the basis of the output signal of the brake-operating force sensor 204. Step S1 is followed by step S2 to determine the desired value $P_3^*$ of the fluid pressure $P_3$ on the basis of the detected brake operating force $F_P$. Then, the control flow goes to step S3 to determine the first provisional current amount $I_{L1}$ on the basis of the determined desired value $P_3^*$. The control flow then goes to step S4 to detect the fluid pressures $P_1$ and $P_3$ on the basis of the output signals of the master-cylinder pressure sensor 206 and the control pressure sensor 205, respectively. Step S4 is followed by step S5 to determine the desired value $P_3^*$ of the fluid pressure $P_3$ on the basis of the detected fluid pressures $P_1$ and $P_3$. The control flow then goes to step S6 to determine the second provisional current value $I_{L2}$ on the basis of the desired value $P_3^*$ determined in step S5. Step S6 is followed by step S7 to determine the desired value $P_3^*$ on the basis of the detected fluid pressure $P_1$, and step S8 to determine the third provisional current value $I_{L3}$ on the basis of the desired value $P_3^*$ determined in step S7. Then, the control flow goes to step S9 to determine the final current amount $I_L$ on the basis of the determined first, second and third provisional current amounts $I_{L1}$, $I_{L2}$ and $I_{L3}$.

Figure 10:
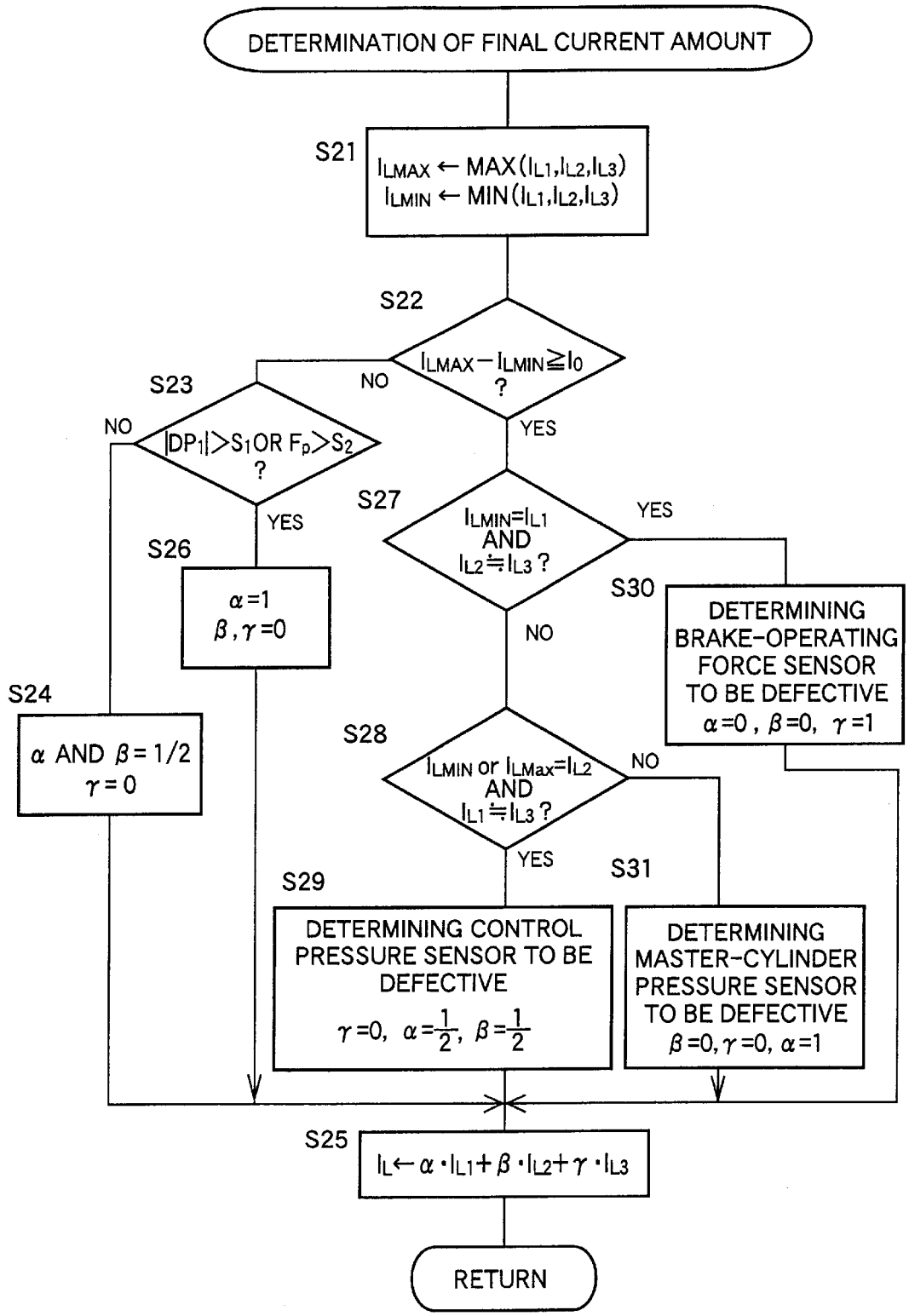
FIG. 10 is a flow chart illustrating a part of the current determining routine of FIG. 9.

The determination of the final current amount $I_L$ is effected according to a routine illustrated in the flow chart of FIG. 10. The routine of FIG. 10 is initiated with step S21 to determine the largest one of the three provisional current amounts $I_{L1}$, $I_{L2}$ and $I_{L3}$ as a maximum current amount $I_{LMAX}$, and determine the smallest one of the three provisional current amounts $I_{L1}$, $I_{L2}$ and $I_{L3}$ as a minimum current amount $I_{LMIN}$. Then, the control flow goes to step S22 to determine whether a difference $(I_{LMAX}-I_{LMIN})$ between the maximum and minimum current amounts $I_{LMAX}$ and $I_{LMIN}$ is equal to or larger than a predetermined threshold $I_0$. If the difference is kept equal to or larger than the threshold $I_0$ for more than a predetermined time, it indicates that at least one of the three sensors 204–206 is defective. If the difference is smaller than the threshold, it indicates that all of the three sensors 204–206 are defective.

If a negative decision (NO) is obtained in step S22, the control flow goes to step S23 to determine whether the operating speed of the brake pedal 12 is higher than a predetermined upper limit $S_1$, and whether the operating force $F_P$ of the brake pedal is larger than a predetermined upper limit $S_2$. The operating speed of the brake pedal 12 is represented by an absolute value $|DP_1|$ of an amount of change $DP_1$ of the master cylinder pressure $P_1$. If neither the absolute value $|DP_1|$ nor the brake operating force $F_P$ has exceeded the predetermined upper limit S1, S2, a negative decision (NO) is obtained in step S23, and the control flow goes to step S24 to determine that the three sensors 204–206 are all normal and set the coefficients α and β to be ½ and the coefficient γ to be zero (0). Step S24 is followed by step S25 to determine the final current amount $I_L$ to be $(I_{L1}/2+I_{L2}/2)$. In this case, therefore, the pressure control valve 70 is controlled in the normal manner, so as to reduce the control hunting while reducing the deterioration of the control response.

If the operating speed of the brake pedal 12 is higher than the upper limit $S_1$, or if the brake operating force FP is larger than the upper limit $S_2$, an affirmative decision (YES) is obtained in step S23, and the control flow goes to step S26 to determine the coefficient α to be 1 and the coefficients β and γ to be zero (0). In this case, too, the final current amount IL is determined in step S25 to be $I_{L1}$, so that the pressure control valve 70 is controlled with a relatively high degree of control response.

If the absolute value of the difference between the maximum and minimum current amounts $I_{LMAX}$ and $I_{LMIN}$ is equal to or larger than the predetermined threshold I0, it indicates that any of the three sensors 204–206 is defective. In this case, an affirmative decision (YES) is obtained in step S22, and the control flow goes to step S27 to determine whether the minimum current amount $I_{LMIN}$ is equal to the first provisional current amount $I_{L1}$, and whether the second and third provisional current amounts $I_{L2}$ and $I_{L3}$ are almost equal to each other. If both of these two determinations in step S27 are not affirmative, a negative decision (NO) is obtained in step S27, and the control flow goes to step S28 to determine whether the minimum current amount $I_{LMIN}$ or maximum current amount $I_{LMAX}$ is equal to the first provisional current amount $I_{L1}$, and whether the first and third provisional current amounts $I_{L1}$ and $I_{L3}$ are almost equal to each other.

If both of these two determinations in step S28 are affirmative, an affirmative decision (YES) is obtained in step S28, and the control flow goes to step S29 to determine that the control pressure sensor 205 is defective, and set the coefficients α and β to be ½ and the coefficient γ to be zero (0).

If both of the two determinations in step S27 are affirmative, the control flow goes to step S30 to determine that the braking-force sensor 204 is defective, and set the coefficients α and β to be zero (0) and the coefficient γ to be 1. If both of the two determinations in step S28 are not affirmative, a negative decision (NO) is obtained in step S28, and the control flow goes to step S31 to determine that the master-cylinder pressure sensor 206 is defective, and set the coefficients β and γ to be zero (0) and the coefficient α to be 1.

As described above, the final current amount $I_L$ is determined on the output signal or signals of the normal sensor or sensors 204, 205, 206, and the coefficients α, β and γ used in the equation in step S25 are changed from the standard or normal values used in step S24 when any of the sensors 204–206 is defective.

It will be understood from the foregoing description of the first embodiment of this invention that the pressure control valve 70 functions as a pressure control actuator, and that the operating-force sensor 204, control pressure sensor 205 and master-cylinder pressure sensor 206, and a portion of the ECU 190 assigned to execute the current determining routine of FIG. 9 cooperate with each other to constitute an actuator control device for controlling the pressure control actuator. It will also be understood that a portion of the ECU 190 assigned to implement steps S1–S3 constitutes a first provisional-control-amount determining portion operable to determine the first provisional current amount $I_{L1}$ as a first provisional control amount, and a portion of the ECU assigned to implement steps S4–S6 constitutes a second provisional-control-amount determining portion operable to determine the second provisional current amount $I_{L2}$ as a second provisional control amount, while a portion of the ECU 190 assigned to implement steps S7 and S8 constitutes a third provisional-control-amount determining portion operable to determine the third provisional current amount $I_{L3}$ as a third provisional control amount. It will further be understood that a portion of the ECU 190 assigned to implement step S9 constitutes a final-control-value determining portion for determining the final current amount $I_L$ as a final control value, and a portion of the ECU 190 assigned to implement steps S21, S22 and S27–S31 constitutes a defective-sensor determining portion operable to determine which one of the sensors 204–206 is defective, or a sensor diagnosing portion operable to diagnose the sensors 204–206 for determining whether any one of the sensors is defective. It will also be understood that a portion of the ECU 190 assigned to implement steps S29–S31 constitutes a special final-control-value determining portion operable to determine the final current amount $I_L$ as a final control value when any of the sensors is diagnosed to be defective.

In the first embodiment described above, the actual fluid pressure $P_3$ in the rear pressurizing chamber 50 is detected as the control pressure by the control pressures sensor 205, and is feedback-controlled on the basis of the detected control pressure. However, since the fluid pressure $P_3$ in the rear pressurizing chamber 50 can be estimated on the basis of the master cylinder pressure $P_1$ and the brake operating force $F_P$, the fluid pressure $P_3$ may be feedback-controlled on the basis of the detected master cylinder pressure $P_1$ and brake operating force $F_P$. For instance, the fluid pressure $P_3$ may be estimated according to the following equation:

$$P_3 = (A_{m1} \times P_1 - (F_P - Fa) \times R_P)/A_{m3}$$

Alternatively, the electric current applied to the pressure control valve 70 may be feedback-controlled such that the actual amount of electric current flowing through the solenoid coil 82 coincides with the determined final current amount $I_L$.

The manner of determining the coefficients α, β and γ used as the weights of the first, second and third provisional current amounts $I_{L1}$, $I_{L2}$ and $I_{L3}$ is not limited to that described above. For instance, the coefficients α and β, which are 1:1 in the first embodiment when the sensors 204–206 are normal, may be 4:6, 3:7, 2:8, or 1:9. When the sensors 204–206 are normal, a need for reduction in the control hunting is usually higher than a need for improvement in the response. In this respect, it is desirable to give a heavier weight to the second provisional current value $I_{L2}$ than to the first provisional current amount $I_{L1}$. It is also possible to determine the final current amount $I_L$ on the basis of the first and third provisional current amounts $I_{L1}$ and $I_{L3}$, rather than the first and second provisional current amounts $I_{L1}$ and $I_{L2}$, where the sensors 204–206 are all normal. The above-indicated ratio of the coefficients α and β applies to the ratio of the coefficients α and α and γ. Alternatively, the final current amount IL may be determined on the basis of the first, second and third provisional current amounts $I_{L1}$, $I_{L2}$ and $I_{L3}$. In this case, the coefficients α, β and γ may be 1:1:1, or 1:0.5:0.5. As described above with respect to the coefficient α and β, it is desirable to give heavier weights to the second and third provisional current amounts than to the first provisional current value, when the sensors 204–206 are all normal.

Where the operating-force sensor 204 is defective, the coefficients α and β set to be zero, and the coefficient γ is set to be 1, in the illustrated first embodiment. However, it is possible that the coefficient β is set to be 1, and the coefficients α and γ are set to be zero, or that the coefficient α is set to be zero, and the coefficients β and γ are set to be ½. Namely, the coefficients β and γ may be determined as desired, as long as an equation β+γ=1 is satisfied.

In the first embodiment, the final current amount $I_L$ is determined on the basis of the first, second and third provisional current amounts $I_{L1}$, $I_{L2}$ and $I_{L3}$, the second provisional current amount $I_{L2}$ may be replaced by a fourth provisional current amount $I_{L4}$ (fourth provisional control amount) which is determined on the basis of the detected brake operating force $F_P$ and master cylinder pressure $P_1$. For instance, a desired value $P_1^*$ of the master cylinder pressure $P_1$ is determined on the basis of the detected brake operating force $F_P$, and the fourth provisional current amount $I_{L4}$ in the present control cycle is determined on the basis of an error of the actual master cylinder pressure $P_1$ from the desired value $P_1^*$, and the fourth provisional current value $P_{L4}$ in the last control cycle or the final current amount $I_L$ in the last control cycle.

When the first and fourth provisional current amounts $P_{L1}$, $P_{L4}$ are relatively small while the third provisional current amount $P_{L3}$ is relatively large, it is determined that the operating-force sensor 204 is defective, and the final current amount $I_L$ is determined on the basis of the third provisional current amount $P_{L3}$. Where the third provisional current amount $I_{L3}$ is the minimum amount $I_{LMIN}$ wile the fourth provisional current amount $I_{L4}$ is the maximum amount $I_{LMAX}$, it is determined that the master-cylinder pressure sensor 206 is defective, and the final current amount $I_L$ is determined on the basis of the first provisional current amount $I_{L1}$. Since the fourth provisional current amount $I_{L4}$ is determined on the basis of the error of the detected actual master cylinder pressure $P_1$ with respect to the desired value $P_1^*$, the fourth provisional current amount $I_{L4}$ becomes relatively large if the actual master cylinder pressure $P_1$ detected by the master cylinder pressure sensor 206 is excessively low due to a defect of that sensor 206, or the fourth provisional current amount $I_{L4}$ becomes relatively small if the brake operating force $F_P$ used to determine the desired value $P_1^*$ is excessively small.

The second provisional current value $I_{L2}$ may be replaced by a fifth provisional current amount $I_{L5}$ (fifth provisional control amount) which is determined on the basis of the detected brake operating force $F_P$ and control pressure $P_3$. In this case, the master cylinder pressure $P_1$ is estimated on the basis of the detected brake operating force $F_P$ and control pressure $P_3$, and the desired value $P3^*$ of the control pressure $P_3$ is determined on the basis of the estimated master cylinder pressure $P_1$.

Where the first provisional current amount $I_{L1}$ is the minimum current amount $I_{LMIN}$ while the third provisional current amount is the maximum current amount $I_{LMAX}$, it is determined that the operating-force sensor 204 is defective, and the final current amount $I_L$ is determined on the basis of the third provisional current amount $I_{L3}$. Where the fifth provisional current amount $I_{L5}$ is the minimum current amount $I_{LMIN}$, it is determined that the control pressure sensor 205 is defective, and the final current value $I_L$ is determined on the basis of the first and third provisional current amounts $I_{L1}$ and $I_{L3}$. Where the third provisional current amount $I_{L3}$ is the minimum current amount $I_{LMIN}$, it is determined that the master cylinder pressure sensor 206 is defective, and the final current amount $I_L$ is determined on the basis of the first and fifth provisional current amounts $I_{L1}$ and $I_{L5}$.

In the first embodiment, the sensors 204–206 are diagnosed to be defective where the level of the output signals is zero or excessively low due to disconnection of electrical wires or similar abnormality of the sensors. However, other kinds of defects of the sensors 204–208 may be detected. The provisional current amount determined on the basis of the output signal of the defective sensor 204, 205, 206 is different from the provisional current amount determined on the basis of the output signal of the normal sensor or sensors 204, 205 206. Thus, it is possible to determine which one of the sensors 204–206 is defective.

The final current amount IL may be determined on the basis of at least two provisional current amounts selected from the first through fifth provisional current amounts $I_{L1}$–$I_{L5}$ indicated above and a sixth provisional current amount $I_{L6}$ (sixth provisional control amount) which is determined on the basis of the operating state of the brake pedal 12, output pressure (master cylinder pressure $P_1$) of the hydraulic pressure control apparatus and control pressure (pressure $P_3$). Where at least three of the six provisional current amounts are used, it is possible to determine the defective sensor or sensors 204, 205, 206, and continue the control of the pressure control valve 70 even where any of the sensors is defective.

In the first embodiment, the operating force $F_P$ of the brake pedal 12 is used as a parameter representative of the operating state of the brake pedal 12, it is possible to use other parameters representative of the operating state of the brake pedal 12. Examples of those other parameters include an operating stroke of the brake pedal 12 detected by a suitable stroke sensor, and an amount determined by the operating force $F_P$ and the operating stroke.

The construction of the braking system is not limited to that of the illustrated embodiment. For example, the master cylinder need not have the rear pressurizing chamber 50, and may be an ordinary master cylinder of tandem type in which the two pressurizing pistons 32, 34 are arranged in series with each other. An example of this modification is illustrated in FIG. 11.

Figure 11:
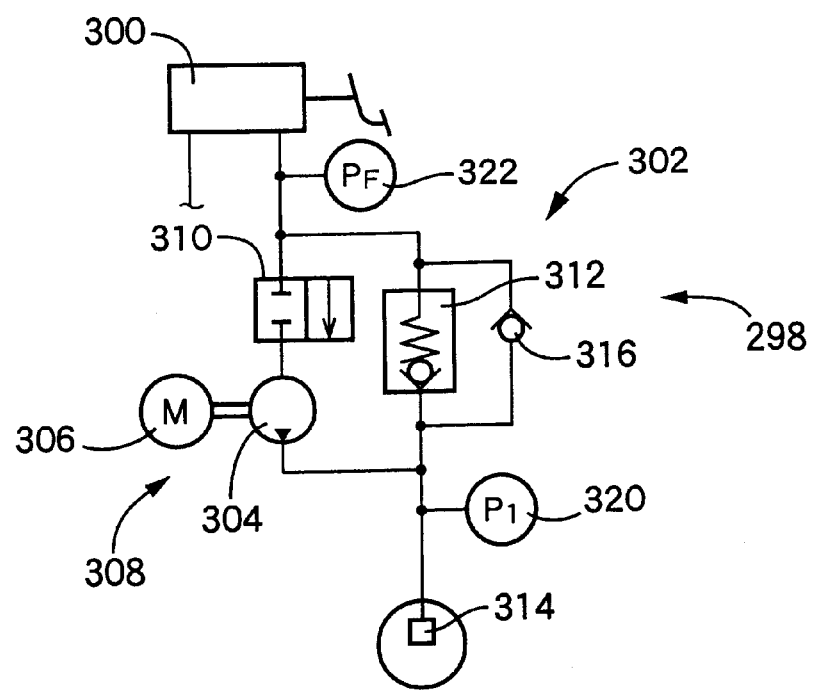
FIG. 11 is a hydraulic circuit diagram showing a portion of a braking system including a hydraulic pressure control apparatus constructed according to a second embodiment of this invention.

The braking system shown in FIG. 11 includes a hydraulic pressure control apparatus constructed according to a second embodiment of this invention, which includes a hydraulic pressure source device 298, which in turn includes a master cylinder 300 and a pressure-increasing device 302 disposed downstream of the master cylinder 300.

The pressure-increasing device 302 includes: a pump device 308 including a pump 304 and a pump motor 306: a solenoid-operated shut-off valve 310 disposed on the suction side of the pump 304; and a pressure control valve 312 disposed in parallel with the pump 304. The solenoid-operated shut-off valve 310 is closed when the master cylinder 300 is connected directly to a wheel brake cylinder 314, and is opened when the fluid pressure to be applied to the wheel brake cylinder 314 is controlled by the pressure-increasing device 302. Like the pressure control valve 70 provided in the first embodiment, the pressure control valve 312 is a normally open valve. However, the valve 312 is arranged to receive a force based on a difference between the fluid pressure in the master cylinder 300 and an output pressure $P_1$ of the hydraulic pressure source device 298. By controlling the electromagnetic force generated by application of an electric current to the solenoid coil of the pressure control valve 312, the above-indicated pressure difference can be controlled, that is, the amount of increase of the fluid pressure by the pressure-increasing device 302 can be controlled.

A check valve 316 is provided in parallel with the pressure control valve 312. This check valve 316 permits a flow of the fluid in a direction from the master cylinder 300 toward the wheel brake cylinder 314, but inhibits a flow of the fluid in the reverse direction. In the presence of the check valve 316, the fluid pressure in the wheel brake cylinder 314 can be increased with an increase in the fluid pressure in the master cylinder 300 even while the pressure control valve 312 is held in the closed state.

The output pressure $P_1$ of the power-operated hydraulic pressure source device 298 is detected by an output pressure sensor 320, and the fluid pressure $P_F$ in the master cylinder 300 is detected by a master-cylinder pressure sensor 322. The output pressure P1 detected by the output pressure sensor 320 is the delivery pressure of the pump 304, which is higher than the master cylinder pressure $P_F$ by an amount Pa by which the master cylinder pressure $P_F$ is increased by the pump 304. This amount of increase Pa by the pump 304 can be controlled by controlling the amount of electric current (final current amount $I_L$) to be applied to the pressure control valve 312. The amount of increase Pa is controlled such that the output pressure P1 and the brake operating force $F_P$ has a predetermined relationship. The final current amount $I_L$ is determined according to the following equation on the basis of a first provisional current amount IL1, a third provisional current amount $I_{L3}$, and coefficients α and β which determine the weights of the first and third provisional current amounts $I_{L1}$ and $I_{L3}$, respectively. The first provisional current amount $I_{L1}$ is determined by the brake operating force $F_P$, and the third provisional current amount $I_{L3}$ is determined by the output pressure $P_1$.

$$IL=\alpha \cdot I_{L1}+\beta \cdot IL3,$$

The coefficients α and β are zero or larger, and are determined so as to satisfy an equation, α+β=1. In the present second embodiment, the brake operating force $F_P$ is determined on the basis of the output signal of the master-cylinder pressure sensor 222. It will be understood that the pressure control valve 312 constitutes a pressure control actuator.

As described above, the amount of electric current IL to be applied to the pressure control valve 312 is determined on the basis of the first provisional current amount determined by the brake operating force, and the second provisional current amount determined by the output pressure of the hydraulic pressure source device 298. Accordingly, the pressure control valve 312 is controlled so as to reduce control hunting while maintaining a high degree of control response.

It is noted that the pressure control valve 312 is not essential. In the absence of the pressure control valve 312, the delivery pressure of the pump 304 is controlled to control the output pressure of the hydraulic pressure source device 298, by controlling the pump motor 306. In this case, the pressure-increasing device 302 serves as a pressure control actuator. The pressure-increasing device 302 may be disposed downstream of the master cylinder 14 in the first embodiment.

The pressure-increasing device 302 may be replaced by a linear valve device. In this instance, the master cylinder pressure is reduced into the output pressure of the hydraulic pressure source device, by controlling the linear valve device. This arrangement is effective in a braking system which is adapted to effect a cooperative braking operation in which the vehicle is braked with both a hydraulic braking force generated by the wheel brake cylinder 314, and a regenerative braking force generated by a motor/generator operated as a regenerative brake with a kinetic energy of the running vehicle during deceleration of the vehicle.

While the presently preferred embodiment of this invention have been described above in detail by reference to the drawings, for illustrative purpose only, it is to be understood that the present invention may be embodied with various changes, modifications and improvements, such as those described in the SUMMARY OF THE INVENTION, which may occur to those skilled in the art, without departing from the spirit and scope of the invention defined in the following claims:

What is claimed is:

1. A hydraulic pressure control apparatus for use with a manually operable operating member, said hydraulic pressure control device comprising:

a hydraulic pressure source device including a pressure control actuator operable according to a control amount, said hydraulic pressure source device being operable to generate an output pressure thereof on the basis of a fluid pressure corresponding to an operating force of said manually operable operating member, and on the basis of a control pressure controlled by said pressure control actuator; and an actuator control device including a final-control-value determining portion operable to determine a final value of said control amount, said actuator control device controlling said pressure control actuator according to said final value determined by said final-control-value determining portion, wherein said final-control-value determining portion determines said final value of said control amount on the basis of at least two provisional control values selected from the group consisting of (a) at least one first provisional control value each of which is determined on the basis of at least one physical quantity including one of (i) an operating-state value representative of an operating state of said manually operable operating member and (ii) said output pressure of said hydraulic pressure source device, and (b) at least one second provisional control value each of which is determined on the basis of a combination of physical quantities which includes at least two of said operating-state value, said output pressure and said control pressure controlled by said pressure control actuator, and wherein said hydraulic pressure source device is mechanically constructed such that a change of any one of said output pressure, said fluid pressure and said control pressure while another of said output pressure, said fluid pressure and said control pressure is held constant causes a change of a remaining one of said output pressure, said fluid pressure and said control pressure.

2. A hydraulic pressure control apparatus according to claim 1, wherein said hydraulic pressure source device includes:

a power-operated pressure source device electrically operable to pressurize a working fluid; and a master cylinder including a housing, and a pressurizing piston fluid-tightly and slidably received in said housing and cooperating with said housing to define a front pressurizing chamber on one of opposite sides thereof and a rear pressurizing chamber on the other side thereof, said pressurizing piston being advanced by said operating force of said manually operable operating member by an operator of the apparatus, to pressurize the working fluid in said front pressurizing chamber, and wherein said pressure control actuator is arranged to control a pressure of the working fluid in said rear pressurizing chamber, as said control pressure.

3. A hydraulic pressure control apparatus according to claim 1, wherein said hydraulic pressure source device includes a master cylinder operable to generate a fluid pressure corresponding to said operating force of said manually operable operating member, and a pressure-increasing device disposed downstream of said master cylinder and operable to increase the fluid pressure generated by said master cylinder, said pressure-increasing device including said pressure control actuator.

4. A hydraulic pressure control apparatus according to claim 3, wherein said pressure-increasing device includes a pump disposed downstream of said master cylinder, and an electric motor operable to drive said pump.

5. A hydraulic pressure control apparatus according to claim 1, wherein said at least one physical quantity consists of an operating force applied to said manually operable operating member.

6. A hydraulic pressure control apparatus according to claim 1, wherein said at least one physical quantity consists of said output pressure of said hydraulic pressure source device.

7. A hydraulic pressure control apparatus for use with a manually operable operating member, said hydraulic pressure control device comprising:

a hydraulic pressure source device including a pressure control actuator operable according to a control amount, said hydraulic pressure source device being operable to generate an output pressure thereof on the basis of a fluid pressure corresponding to an operating force of said manually operable operating member, and on the basis of a control pressure controlled by said pressure control actuator;

an actuator control device including a final-control-value determining portion operable to determine a final value of said control amount, said actuator control device controlling said pressure control actuator according to said final value determined by said final-control-value determining portion;

an operating-state-value detecting device operable to detect said operating-state value of said manually operable operating member;

a control-pressure detecting device operable to detect said control pressure controlled by said pressure control actuator; and an output-pressure detecting device operable to detect said output pressure of said hydraulic pressure source device, wherein said final-control-value determining portion determines said final value of said control amount on the basis of at least two provisional control values selected from the group consisting of (a) at least one first provisional control value each of which is determined on the basis of at least one physical quantity including one of (i) an operating-state value representative of an operating state of said manually operable operating member and (ii) said output pressure of said hydraulic pressure source device, and (b) at least one second provisional control value each of which is determined on the basis of a combination of physical quantities which includes at least two of said operating-state value, said output pressure and said control pressure controlled by said pressure control actuator, and wherein said final-control-value determining portion includes a provisional-control-value determining portion operable to determine said at least one first provisional control value on the basis of one of an output signal of said operating-state-value detecting device and an output signal of said output-pressure detecting device, and determine said at least one second provisional control value on the basis of the output signals of at least two of said operating-state-value detecting device, said control-pressure detecting device and said output-pressure detecting device, said actuator control device further including a defective-device determining portion operable on the basis of at least three provisional control values selected from among said at least one first provisional control value and said at least one second provisional control value which are determined by said provisional-control-value determining portion, said defective-device determining portion determining which one of said operating-state-value detecting device, said control-pressure detecting device and said output-pressure detecting device is defective.

8. A hydraulic pressure control apparatus according to claim 7, wherein said actuator control device includes a special final-control-value determining portion operable when at least one of said operating-state-value detecting device, said control-pressure detecting device and said output-pressure detecting device is diagnosed to be defective by said defective-device determining portion, said special final-control-value determining portion determining said final value of said control amount, on the basis of said at least two provisional control values except at least one provisional control value which is determined on the basis of the output signal of said at least one detecting device which has been diagnosed to be defective.

9. A hydraulic pressure control apparatus according to claim 8, wherein said special final-control-value determining portion is operable to substantially zero a weight which is given to each of said at least one provisional control value which is determined on the basis of the output signal of said at least one detecting device which has been diagnosed to be defective by said defective-device determining portion.

10. A hydraulic pressure control apparatus for use with a manually operable operating member said hydraulic pressure control device comprising:

a hydraulic pressure source device including a pressure control actuator operable according to a control amount, said hydraulic pressure source device being operable to generate an output pressure thereof on the basis of a fluid pressure corresponding to an operating force of said manually operable operating member, and on the basis of a control pressure controlled by said pressure control actuator; and an actuator control device including a final-control-value determining portion operable to determine a final value of said control amount, said actuator control device controlling said pressure control actuator according to said final value determined by said final-control-value determining portion, wherein said final-control-value determining portion determines said final value of said control amount on the basis of at least two provisional control values selected from the group consisting of (a) at least one first provisional control value each of which is determined on the basis of at least one physical quantity including one of (i) an operating-state value representative of an operating state of said manually operable operating member and (ii) said output pressure of said hydraulic pressure source device, and (b) at least one second provisional control value each of which is determined on the basis of a combination of physical quantities which includes at least two of said operating-state value, said output pressure and said control pressure controlled by said pressure control actuator, and wherein said final-control-value determining portion is operable to determine said final value of said control amount on the basis of at least two of a first provisional control amount determined on the basis of said operating-state value of said manually operable operating member, a second provisional control amount determined on the basis of said output pressure of said hydraulic pressure source device and said control pressure controlled by said pressure control actuator, and a third provisional control amount determined on the basis of said output pressure of said hydraulic pressure source device.

11. A hydraulic pressure control apparatus according to claim 10, wherein said final-control-value determining portion is operable to determine said final value of said control amount on the basis of said first, second and third provisional control amounts.

12. A hydraulic pressure control apparatus according to claim 10, wherein said actuator control device includes:

a first provisional-control-amount determining portion operable to determine said first provisional control amount on the basis of an output signal of an operating-state-value detecting device operable to detect said operating-state value of said manually operable operating member;

a second provisional-control-amount determining portion operable to determine said second provisional control amount on the basis of an output signal of a control-pressure detecting device operable to detect said control pressure controlled by said pressure control actuator, and an output signal of an output-pressure detecting device operable to detect said output pressure of said hydraulic pressure source device;

a third provisional-control-amount determining portion operable to determine said third provisional control amount on the basis of said output signal of said output-pressure detecting device; and a sensor diagnosing portion operable to compare said first, second and third provisional control amounts, and thereby determine whether any one of said operating-state-value detecting device, said control-pressure detecting device and said output-pressure detecting device is defective.

13. A hydraulic pressure control apparatus according to claim 10, wherein said actuator control device includes:

a first provisional-control-amount determining portion operable to determine said first provisional control amount on the basis of an output signal of an operating-state-value detecting device operable to detect said operating-state value of said manually operable operating member;

a second provisional-control-amount determining portion operable to determine said second provisional control amount on the basis of an output signal of a control-pressure detecting device operable to detect said control pressure controlled by said pressure control actuator, and an output signal of an output-pressure detecting device operable to detect said output pressure of said hydraulic pressure source device;

a third provisional-control-amount determining portion operable to determine said third provisional control amount on the basis of said output signal of said output-pressure detecting device; and a defective-device determining portion operable on the basis of said first, second and third provisional control amounts, to determine which one of said operating-state-value detecting device, said control-pressure detecting device and said output-pressure detecting device is defective.

14. A hydraulic pressure control apparatus according to claim 13, wherein said actuator control device includes a special final-control-value determining portion operable to determine said final value of said control amount for said pressure control actuator, on the basis of said first, second and third provisional control amounts except the provisional control amount which is determined on the basis of the output signal of the detecting device which has been diagnosed to be defective by said defective-device determining portion.

15. A hydraulic pressure control apparatus according to claim 13, wherein said special final-control-value determining portion is operable to substantially zero a weight which is given to each of said provisional control amount which is determined on the basis of the output signal of the detecting device which has been diagnosed to be defective by said defective-device determining portion.

16. A hydraulic pressure control apparatus for use with a manually operable operating member, said hydraulic pressure control device comprising:

a hydraulic pressure source device including a pressure control actuator operable according to a control amount, said hydraulic pressure source device being operable to generate an output pressure thereof on the basis of a fluid pressure corresponding to an operating force of said manually operable operating member, and on the basis of a control pressure controlled by said pressure control actuator; and an actuator control device including a final-control-value determining portion operable to determine a final value of said control amount, said actuator control device controlling said pressure control actuator according to said final value determined by said final-control-value determining portion, wherein said final-control-value determining portion determines said final value of said control amount on the basis of at least two provisional control values selected from the group consisting of (a) at least one first provisional control value each of which is determined on the basis of at least one physical quantity including one of (i) an operating-state value representative of an operating state of said manually operable operating member and (ii) said output pressure of said hydraulic pressure source device, and (b) at least one second provisional control value each of which is determined on the basis of a combination of physical quantities which includes at least two of said operating-state value, said output pressure and said control pressure controlled by said pressure control actuator, and wherein said actuator control device comprises:

a control-pressure detecting device operable to detect said control pressure controlled by said pressure control actuator; and a feedback control portion operable to feedback-control said pressure control actuator such that the control pressure as detected by said control-pressure detecting device coincides with a desired value corresponding to said final value of said control amount determined by said final-control-value determining portion.

17. A hydraulic pressure control apparatus for use with a manually operable operating member, said hydraulic pressure control device comprising:

a hydraulic pressure source device including a pressure control actuator operable according to a control amount, said hydraulic pressure source device being operable to generate an output pressure thereof on the basis of a fluid pressure corresponding to an operating force of said manually operable operating member, and on the basis of a control pressure controlled by said pressure control actuator; and an actuator control device including a final-control-value determining portion operable to determine a final value of said control amount, said actuator control device controlling said pressure control actuator according to said final value determined by said final-control-value determining portion, wherein said final-control-value determining portion determines said final value of said control amount on the basis of at least two provisional control values selected from the group consisting of (a) at least one first provisional control value each of which is determined on the basis of at least one physical quantity including one of (i) an operating-state value representative of an operating state of said manually operable operating member and (ii) said output pressure of said hydraulic pressure source device, and (b) at least one second provisional control value each of which is determined on the basis of a combination of physical quantities which includes at least two of said operating-state value, said output pressure and said control pressure controlled by said pressure control actuator, and wherein said final-control-value determining portion of said actuator control device includes a portion operable to determine said final value of said control amount on the basis of said at least two provisional control values and weights of said at least two provisional control values.

18. A hydraulic pressure control apparatus according to claim 17, wherein said portion of said final-control-value determining portion includes a weight determining portion operable to determine the weight to be given to the provisional control value determined on the basis of said operating-state value of said manually operable operating member, such that said provisional control value determined on the basis of said operating-state value is larger when a rate of change of said operating-state value is higher than a predetermined threshold, than when said rate of change is not higher than said predetermined threshold.

19. A hydraulic pressure control apparatus according to claim 17, wherein said weights of said at least two provisional control values are variable.

20. A hydraulic pressure control apparatus for use with a manually operable operating member, said hydraulic pressure control device comprising:

a hydraulic pressure source device including a pressure control actuator operable according to a control amount, said hydraulic pressure source device being operable to generate an output pressure thereof on the basis of a fluid pressure corresponding to an operating force of said manually operable operating member, and on the basis of a control pressure controlled by said pressure control actuator; and an actuator control device including a final-control-value determining portion operable to determine a final value of said control amount, said actuator control device controlling said pressure control actuator according to said final value determined by said final-control-value determining portion, wherein said final-control-value determining portion determines said final value of said control amount on the basis of at least two provisional control values selected from the group consisting of (a) at least one first provisional control value each of which is determined on the basis of at least one physical quantity including one of (i) an operating-state value representative of an operating state of said manually operable operating member and (ii) said output pressure of said hydraulic pressure source device, and (b) at least one second provisional control value each of which is determined on the basis of a combination of physical quantities which includes at least two of said operating-state value, said output pressure and said control pressure controlled by said pressure control actuator, and wherein said pressure control actuator includes a pressure control valve operable to control said control pressure according to an amount of electric current applied thereto as said control amount, and said actuator control device further includes:

a current detecting device operable to detect an amount of electric current actually flowing through said pressure control valve; and a feedback control portion operable to feedback-control said pressure control actuator such that the amount of electric current as detected by said current detecting device coincides with a desired value corresponding to said final value of said control amount determined by said final-control-value determining portion.

21. A hydraulic pressure control apparatus for use with a manually operable operating member, said hydraulic pressure control apparatus comprising:

a hydraulic pressure source device including a pressure control actuator operable according to a control amount, said hydraulic pressure source device being operable to generate an output pressure thereof on the basis of a fluid pressure corresponding to an operating force of said manually operable operating member, and on the basis of a control pressure controlled by said pressure control actuator;

an operating-state-value detecting device operable to detect an operating-state value representative of an operating state of said manually operable operating member;

an output-pressure detecting device operable to detect said output pressure of said hydraulic pressure source device;

a control-pressure estimating device operable to estimate said control pressure controlled by said pressure control actuator, on the basis of said operating-state value detected by said operating-state-value detecting device and said output pressure detected by said output-pressure detecting device; and an actuator control device including a final-control value determining portion operable to determine a final value of the control amount, said actuator control device feedback-controlling the pressure control actuator such that the control pressure as estimated by said control-pressure estimating device coincides with a desired value corresponding to said final value of said control amount determined by said final-control-value determining portion, and wherein said final-control-value determining portion determines said final value of said control amount on the basis of at least one provisional control values selected from the group consisting of (a) at least one first provisional control value each of which is determined on the basis of at least one physical quantity including one of (i) an operating-state value representative of an operating state of said manually operable operating member and (ii) said output pressure of said hydraulic pressure source device, and (b) at least one second provisional control value each of which is determined on the basis of a combination of physical quantities which includes at least two of said operating-state value, said output pressure and said control pressure controlled by said pressure control actuator.

22. A hydraulic pressure control apparatus for use with a manually operable operating member, said hydraulic pressure control device comprising:

a hydraulic pressure source device including a pressure control actuator operable according to a control amount, said hydraulic pressure source device being operable to generate an output pressure thereof on the basis of a fluid pressure corresponding to an operating force of said manually operable operating member, and on the basis of a control pressure controlled by said pressure control actuator; and an actuator control device including a final-control-value determining portion operable to determine a final value of said control amount, said actuator control device controlling said pressure control actuator according to said final value determined by said final-control-value determining portion, wherein said final-control-value determining portion determines said final value of said control amount on the basis of at least two provisional control values selected from the group consisting of (a) at least one first provisional control value each of which is determined on the basis of at least one physical quantity including one of (i) an operating-state value representative of an operating state of said manually operable operating member and (ii) said output pressure of said hydraulic pressure source device, and (b) at least one second provisional control value each of which is determined on the basis of a combination of physical quantities which includes at least two of said operating-state value, said output pressure and said control pressure controlled by said pressure control actuator, and wherein said hydraulic pressure source device is mechanically constructed such that said output pressure is substantially equal to a sum of said fluid pressure and said control pressure.

* * * * *